United States Patent [19]

Satoi et al.

[11] Patent Number: 5,373,633
[45] Date of Patent: Dec. 20, 1994

[54] ASSEMBLING METHOD AND APPARATUS FOR INK-JET HEAD

[75] Inventors: Tsunenobu Satoi; Tsuyoshi Baba, both of Yokohama; Tsuyoshi Orikasa, Kasukabe; Takashi Oba, Atsugi; Masatoshi Kato, Yokohama, all of Japan

[73] Assignee: Canon Kabushiki Kaisha, Tokyo, Japan

[21] Appl. No.: 49,771

[22] Filed: Apr. 21, 1993

[30] Foreign Application Priority Data

Apr. 23, 1992 [JP] Japan .................................. 4-104321
Apr. 23, 1992 [JP] Japan .................................. 4-104322

[51] Int. Cl.$^5$ .......................................... B23P 21/00
[52] U.S. Cl. ................................ 29/890.1; 29/281.1; 29/281.5; 29/407; 29/468; 29/720; 364/468
[58] Field of Search .................... 29/281.1, 281.5, 407, 29/466, 468, 559, 611, 703, 709, 720, 784, 785, 787, 792, 795, 890.1; 901/47; 364/468; 346/140 R, 76 PH

[56] References Cited

U.S. PATENT DOCUMENTS

| 4,100,666 | 7/1978 | Payne | 29/407 |
| 4,602,417 | 7/1986 | Mesch et al. | 29/720 X |
| 4,866,836 | 9/1989 | Von Brandt et al. | 29/407 X |
| 5,243,755 | 9/1993 | Inaba et al. | 29/890.1 |

FOREIGN PATENT DOCUMENTS

| 295502 | 10/1991 | Germany | 29/720 |
| 3-112200 | 5/1991 | Japan | 29/720 |
| 4-2432 | 1/1992 | Japan | 29/720 |

Primary Examiner—Tom Hughes
Attorney, Agent, or Firm—Fitzpatrick, Cella, Harper & Scinto

[57] ABSTRACT

This invention has as its object to provide an ink-jet head assembling apparatus, which can improve productivity by omitting the step of temporarily fixing a top plate and a heater board using an ultraviolet curing adhesive.

In order to achieve this object, an ink-jet head assembling apparatus of this invention includes a plurality of work stations, an index table, upper and front pressing members, arranged at a position on the index table corresponding to at least one of the plurality of work stations, for holding the top plate on the heater board, and first and second driving mechanisms, arranged outside the index table, for switching the holding member between a holding state wherein the top plate member is held on the heater board, and a non-holding state attained by releasing the holding state.

11 Claims, 27 Drawing Sheets

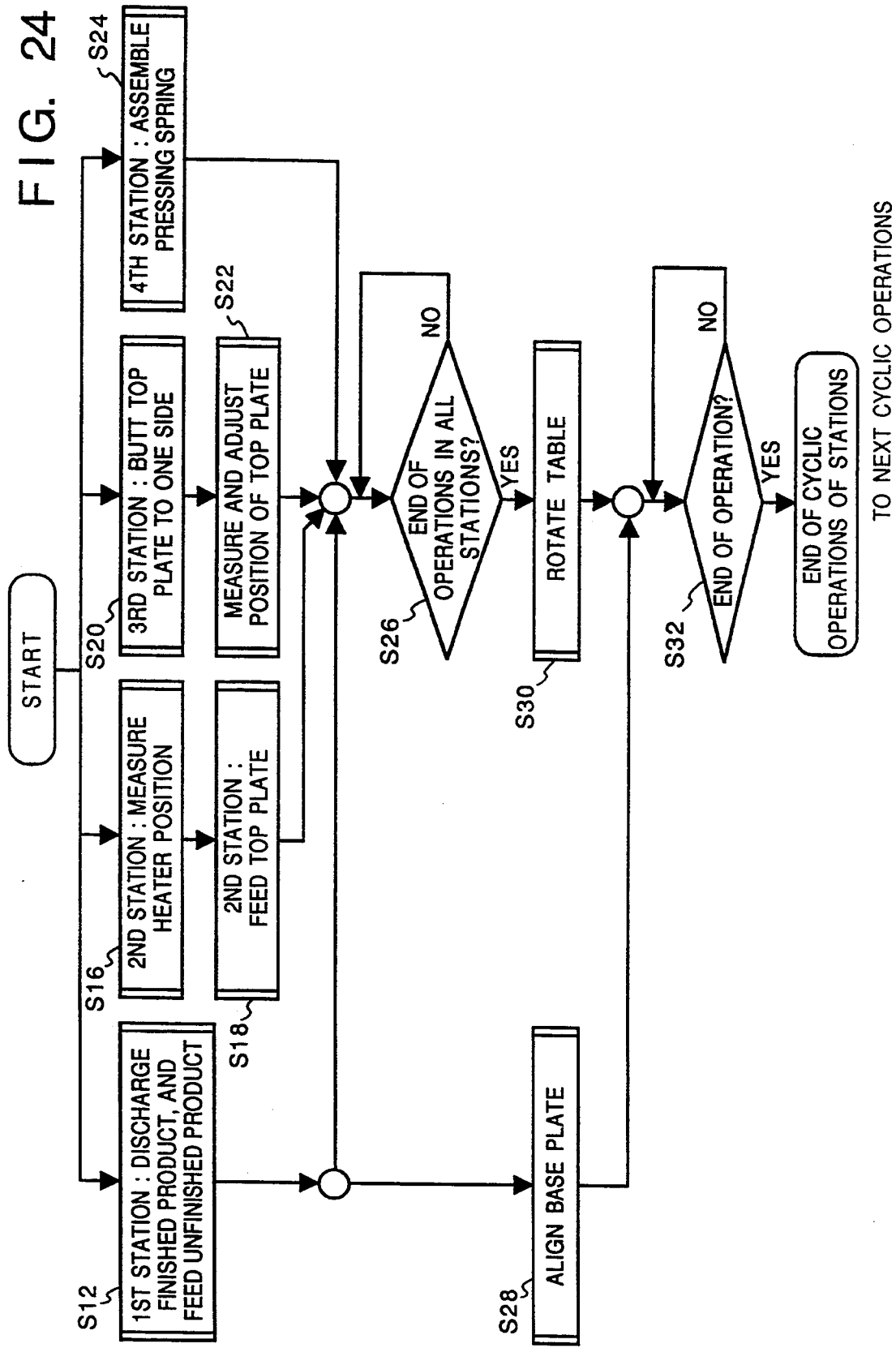

ASSEMBLING METHOD AND APPARATUS FOR INK-JET HEAD

BACKGROUND OF THE INVENTION

The present invention relates to an ink-jet head assembling apparatus for assembling an ink-jet head by attaching a top plate member formed with nozzles corresponding to heaters onto a heater board formed with a plurality of heaters.

In recent years, a print head, which executes a so-called bubble-jet print operation for heating an ink to form a bubble upon ejection of the ink to be printed on a paper sheet, has been developed and put into practical applications since it is advantageous for improving print precision.

In an assembling apparatus for assembling such a bubble-jet print head, heaters for heating the ink and ejection orifices for ejecting ink bubbles obtained by heating and boiling the ink by the corresponding heaters toward a paper sheet must be precisely aligned on the micron order. More specifically, a heater board formed with a large number of heaters and a top plate comprising an orifice plate formed with a large number of ejection orifices must be aligned on the micron order. For example, in order to achieve precision as high as about 360 dpi (dots per inch) as print precision, 64 ejection orifices must be arranged at equal intervals within a range of about 4.5 mm, and the arrangement pitch in this case is as small as about 70 $\mu$m.

In formation of ejection orifices at such small intervals, for example, the ejection orifices can be formed with predetermined allowable high precision on the orifice plate attached to the front surface of the top plate member using an ultra-precision working machine such as a laser working machine. In formation of heaters, the heaters can be similarly formed on the heater board with predetermined allowable high precision using an ultra-precision etching technique.

Under such circumstances, when a bubble-jet print head is to be assembled, the top plate must be placed on and fixed to the heater board in a state wherein the positions of the heaters on the heater board and the positions of the ejection orifices formed on the orifice plate precisely coincide with each other.

A conventional ink-jet head assembling apparatus for aligning a top plate with a heater board with high precision, as described above, will be described below with reference to FIG. 1.

In the conventional ink-jet head assembling apparatus shown in FIG. 1, in order to precisely align the position of a heater board 102 with the position of an orifice plate 108, a first ITV camera 440 for observing ejection orifices formed on the orifice plate 108 from the front side and a second ITV camera 442 for observing heaters on the upper surface of the heater board 102 from the above are respectively arranged in front of and above an assembling jig 416. A top plate 104 and the heater board 102 are precisely aligned on the basis of information of the positions of the ejection orifices and information of the positions of the heaters, which are respectively read by the first and second ITV cameras 440 and 442.

More specifically, in the conventional assembling apparatus, an operation for attaching the top plate 104 on the heater board 102 is performed by the following procedure. First, the second ITV camera 442 measures the position of the heater board 102. The top plate 104 comprising the orifice plate 108 is held by a hand 427, and is placed above the heater board 102. Then, the first ITV camera measures the positions of the ejection orifices of the orifice plate 108. The hand 427 precisely performs position adjustment in the x-direction (a direction perpendicular to the plane of drawing of FIG. 1) and the y-direction on the basis of position information from the first and second ITV cameras 440 and 442. In a state wherein the top plate 104 is aligned with the heater board 102, a leaf spring for fixing the top plate 104 to the heater board 102 is attached from a position above the heater board 102, thus completing the attaching operation of the top plate 104 to the heater board 102.

In the conventional assembling apparatus which performs the above-mentioned assembling operation, when the leaf spring for fixing the top plate 104 is attached to the heater board 102, if the leaf spring is attached from a position above the heater board 102 while the top plate 104 is aligned with the heater board 102 by the hand 427, the hand 427 disturbs the attaching operation of the leaf spring to the top plate 104 and the heater board 102. On the other hand, when the leaf spring is attached after the holding state of the hand 427 is released, and the hand 427 is escaped from the position above the top plate 104, since the positional relationship between the top plate 104 and the heater board 102 is not regulated at all, the top plate 104 and the heater board 102 may be displaced from each other by the attaching operation of the leaf spring.

Since the second ITV camera 442 is arranged above the top plate 102, it also disturbs the attaching operation of the leaf spring.

For this reason, in the conventional assembling apparatus, when the top plate 104 is placed on the heater board 102, a small amount of ultraviolet curing adhesive S is dropped on the heater board 102, the top plate 104 is placed thereon, and the ultraviolet curing adhesive is cured to temporarily fix the top plate 104 and the heater board 102 after adjustment of the position of the top plate 104 with respect to the heater board 102. More specifically, since the top plate 104 is temporarily fixed to the heater board 102 by the adhesive, the top plate 104 and the heater board 102 can be prevented from being displaced from each other even after the hand 427 for holding the top plate 104 in position is escaped, and also when the top plate 104 and the heater board 102 are moved to a position where they are not disturbed by the second ITV camera 442 upon attaching of the leaf spring.

However, in the conventional assembling apparatus, as described above, when the top plate 104 is attached to the heater board 102, since they are temporarily fixed by the ultraviolet curing adhesive, it takes a long time for curing the ultraviolet curing adhesive, thus lowering productivity.

Since the step of placing the top plate 104 on the heater board 102, the step of measuring the positions of the top plate 104 and the heater board 102, and the step of adjusting the position of the top plate 104 with respect to the heater board 102 are sequentially executed as well as the step of curing the ultraviolet curing adhesive, long time is required for assembling one print head, and productivity is lowered. In order to compensate for the low productivity, a large number of expensive assembling apparatuses comprising a precision stage for adjusting the positions of the top plate 104 and the heater board 102, ITV cameras, and the like must be prepared, and an investment for the production line becomes costly.

In the conventional assembling apparatus, since the step of placing the top plate 104 on the heater board 102, the step of measuring the positions of the top plate 104 and the heater board 102, and the step of adjusting the position of the top plate 104 with respect to the heater board 102 are sequentially executed, long time is required for assembling one print head, and productivity is lowered.

As a method of solving this problem, the above-mentioned assembling steps may be divided, and the divided steps may be performed by different work stations. However, for example, when a first work station measures the position of the heater board 102, and a second work station aligns the position of the top plate 104 with the heater board 102, since the positions of works (the heater board 102 and the top plate 104) suffer from variations, the step of adjusting the focusing states of the ITV cameras and the step of adjusting the position of an adjusting mechanism for adjusting the position of the top plate 104 are required in accordance with the variations of the positions of the works when the works are indexed to the position of the second work station. As a result, the tact time of the assembling operation is prolonged, thus lowering productivity.

SUMMARY OF THE INVENTION

The present invention has been made in consideration of the above situation, and has as its principal object to provide an ink-jet head assembling apparatus, which can improve productivity by omitting the step of temporarily fixing a top plate and a heater board using an ultraviolet curing adhesive.

It is another object of the present invention to provide an ink-jet head assembling apparatus, which can improve productivity without preparing a large number of expensive assembling apparatuses.

It is still another object of the present invention to provide an article assembling method in a divisional step type assembling apparatus, which can shorten the tact time of each work station and can improve productivity even when the steps are divided into a plurality of work stations to assemble a single article.

In order to achieve the above-mentioned principal object and other objects, an ink-jet head assembling apparatus of the present invention is characterized by the following arrangement.

More specifically, there is provided an ink-jet head assembling apparatus for assembling a head nozzle for an ink-jet head, which ejects an ink in a predetermined pattern, using a heater board comprising a plurality of heaters for heating the ink, and a top plate member comprising a plurality of ejection orifices for ejecting the ink heated by the corresponding heaters in a jet form, comprising: a plurality of work stations arranged on a circumference of a circle at predetermined angular intervals; an index table rotated about a center of the circle, and aligned at each of the predetermined angular intervals; holding means, arranged at a position on the index table corresponding to at least one of the plurality of work stations in a still state of the index table, for holding the top plate member on the heater board; and switching means, arranged outside the index table, for switching the holding means between a holding state wherein the top plate member is held on the heater board, and a non-holding state attained by releasing the holding state.

With the above-mentioned arrangement of the ink-jet head assembling apparatus according to the present invention, the heater board can be aligned with the top plate member while maintaining a holding state wherein the top plate member and the heater board are held by the holding means, and a fixing member can be attached to the top plate member and the heater board while maintaining the holding state. Therefore, the temporary fixing step using an adhesive can be omitted.

Since the switching means for switching the holding state wherein the top plate member is held with respect to the heater board, and the non-holding state attained after the holding state is released is arranged outside the index table, the switching means need not be arranged in correspondence with a plurality of holding means on the index table. Therefore, the number of switching means can be decreased, and a low-cost apparatus can be realized.

In order to achieve the other object described above, according to the first aspect of the present invention, an article assembling method in a divisional step type assembling apparatus is characterized by the following arrangement.

More specifically, there is provided an article assembling method in a divisional step type assembling apparatus, which has a plurality of work stations, and assembles an article consisting of first and second members in a state wherein the first and second members are aligned with each other, comprising: the first step of measuring a position of the first member by first position detection means arranged on a first work station; and the second step of, based on a detection result of the first position detection means, moving second position detection means arranged on a second work station to an optimal position for measuring a position of the second member, and moving position adjustment means arranged on the second work station to an optimal position for adjusting the position of the second member with respect to the first member during movement of the first member from the first work station to the second work station.

According to the second aspect of the present invention, an article assembling method in a divisional step type assembling apparatus is characterized by the following arrangement.

More specifically, there is provided an article assembling method in a divisional step type assembling apparatus, which has a plurality of work stations, and assembles a head nozzle for a print head for ejecting an ink using a heater board and a top plate member, comprising: the first step of measuring a position of the heater board by first position detection means arranged on a first work station; and the second step of, based on a detection result of the first position detection means, moving second position detection means arranged on a second work station to an optimal position for measuring a position of the top plate member, and moving position adjustment means arranged on the second work station to an optimal position for adjusting the position of the top plate member with respect to the heater board during movement of the heater board from the first work station to the second work station.

With the above-mentioned arrangement of the article assembling method in the divisional step type assembling apparatus according to the present invention, on the basis of position information of the work measured at the first work station, the second measurement means and the position adjustment means are moved to optimal positions according to a variation of a work position during an interval in which the work is conveyed from the first work station to the second work station. Since the time for performing the position adjustment between the second measurement means and the position adjustment means at the second work station can be omitted, the tact time can be shortened and productivity can be improved.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 24 is a flow chart showing the general operation of the assembling apparatus of the embodiment shown in FIG. 6;

DETAILED DESCRIPTION OF THE PREFERRED EMBODIMENTS

The arrangement of an ink-jet head assembling apparatus 10 according to an embodiment of the present invention will be described hereinafter.

[Ink-jet Cartridge 200 & Head Nozzle 100]

The schematic structure of an ink-jet cartridge 200 mounting a head nozzle 100 to be assembled by the assembling apparatus 10 according to the present invention will be described below with reference to FIGS. 2 to 5.

Figure 1:
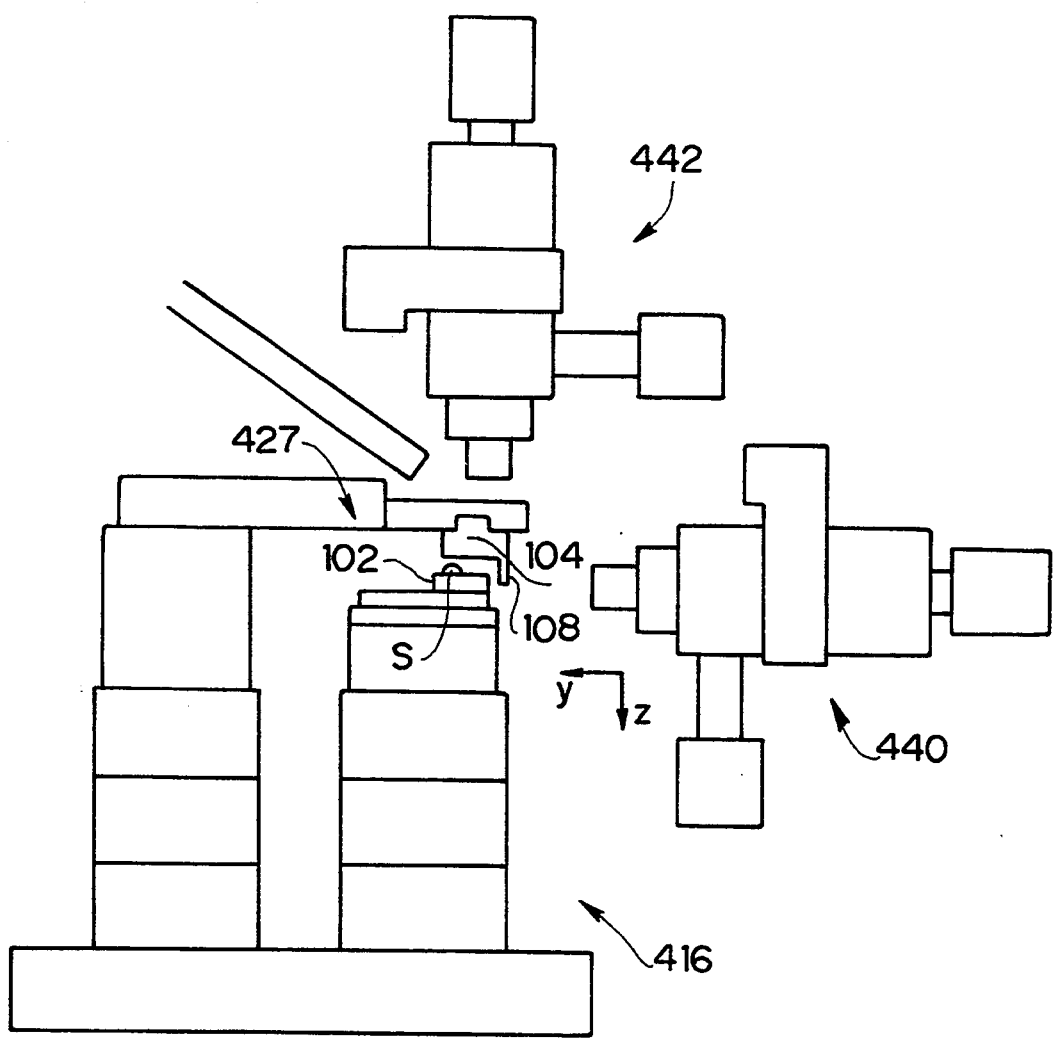
FIG. 1 is a side view showing the structure of a conventional ink-jet head assembling apparatus.
Figure 2:
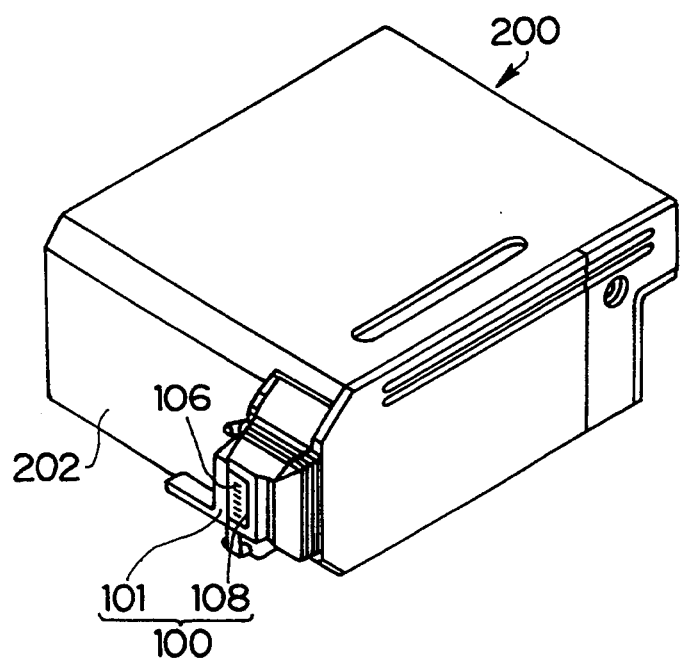
FIG. 2 is a perspective view showing the outline structure of an ink-jet cartridge.
Figure 3:
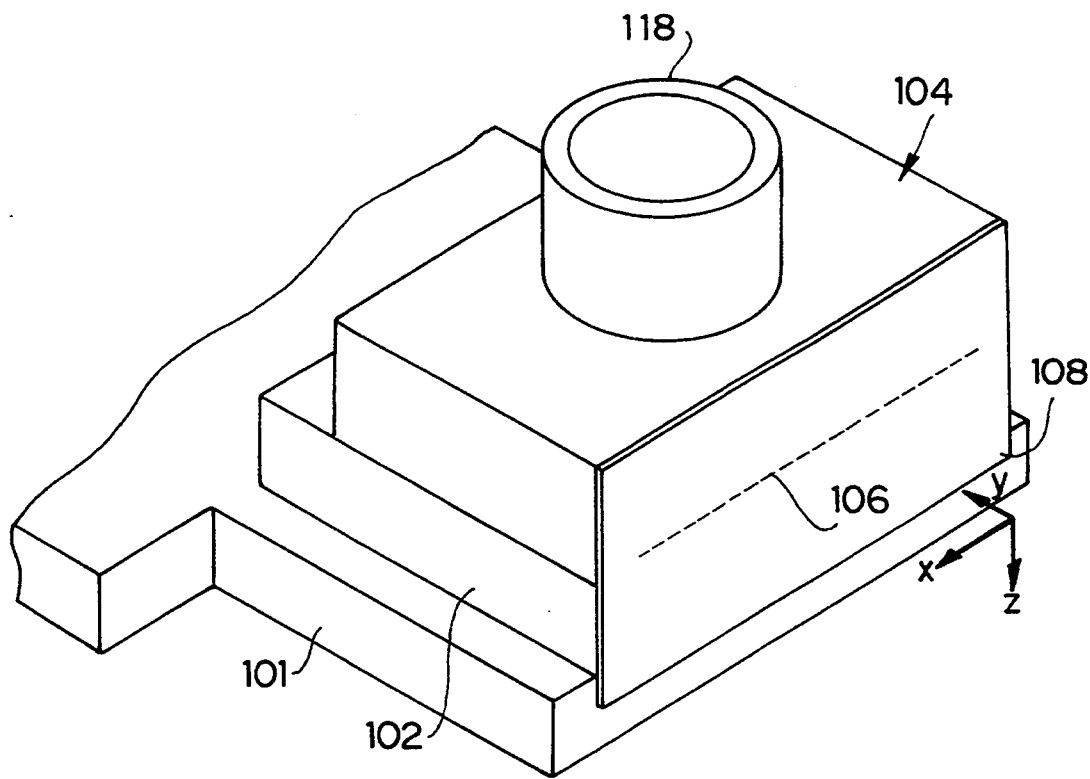
FIG. 3 is a perspective view showing the structure of a head nozzle portion.
Figure 4:
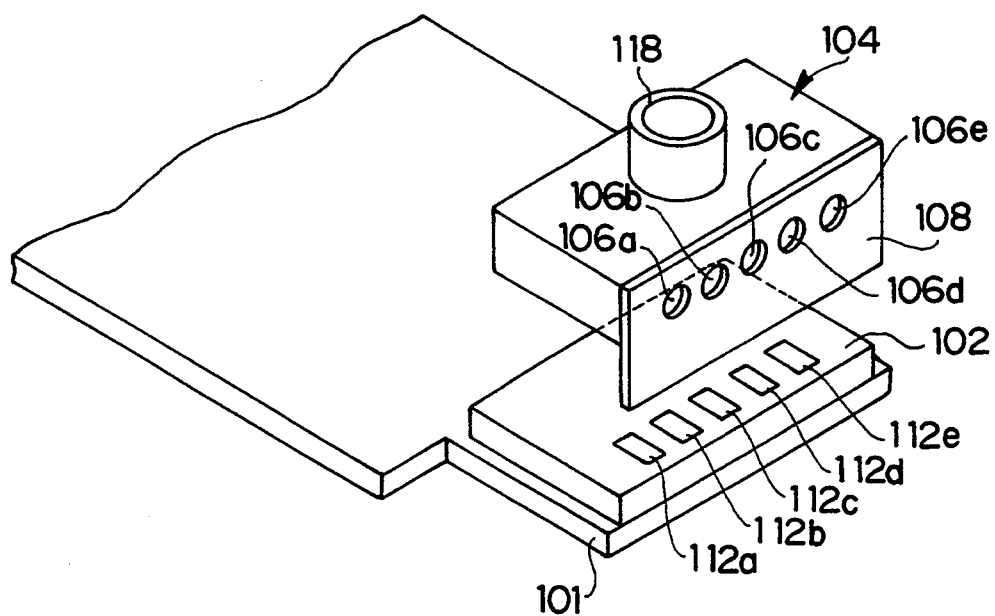
FIG. 4 is an exploded perspective view showing the structure of the head nozzle portion.
Figure 5:
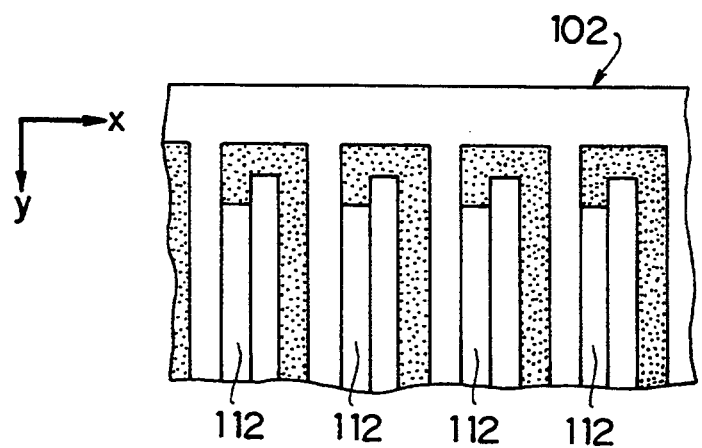
FIG. 5 is a plan view showing the structure of a heater board.

As shown in FIG. 2, the ink-jet cartridge 200 is mainly constituted by an ink tank 202 and the head nozzle 100. As shown in FIGS. 3 and 4, the head nozzle 100 is constituted by a base plate 101, a heater board 102 aligned on the base plate 101 and formed with heaters 112 for heating an ink, a top plate 104 aligned on the heater board 102 and having partition walls for partitioning a plurality of ink channels, a common ink chamber for distributing the ink to the ink channels, a cylindrical ink reception port 118 for supplying the ink to the common ink chamber, and the like, and an orifice plate 108 integrally attached to the front surface of the top plate 104 and having a plurality of ejection orifices 106 corresponding to the ink channels.

In this embodiment, the ejection orifices 106 are arranged at equal intervals across a length of about 4.5 mm, and the heaters 112 are formed on the heater board 102 at the same intervals as those of the ejection orifices 106, as shown in FIG. 4. With the arrangement at these intervals, the print density of the head nozzle 100 is as high precision as about 360 dpi (dots per inch).

[Assembling Apparatus 10]

The assembling apparatus 10 for the head nozzle 100 as the characteristic feature of the present invention, i.e., the arrangement of the assembling apparatus 10 for assembling the grooved top plate 104 onto the heater board 102 in a precisely aligned state, and the assembling method will be described in detail hereinafter with reference to FIG. 6 and subsequent drawings.

<Overall Arrangement of Assembling Apparatus 10>

Figure 6:
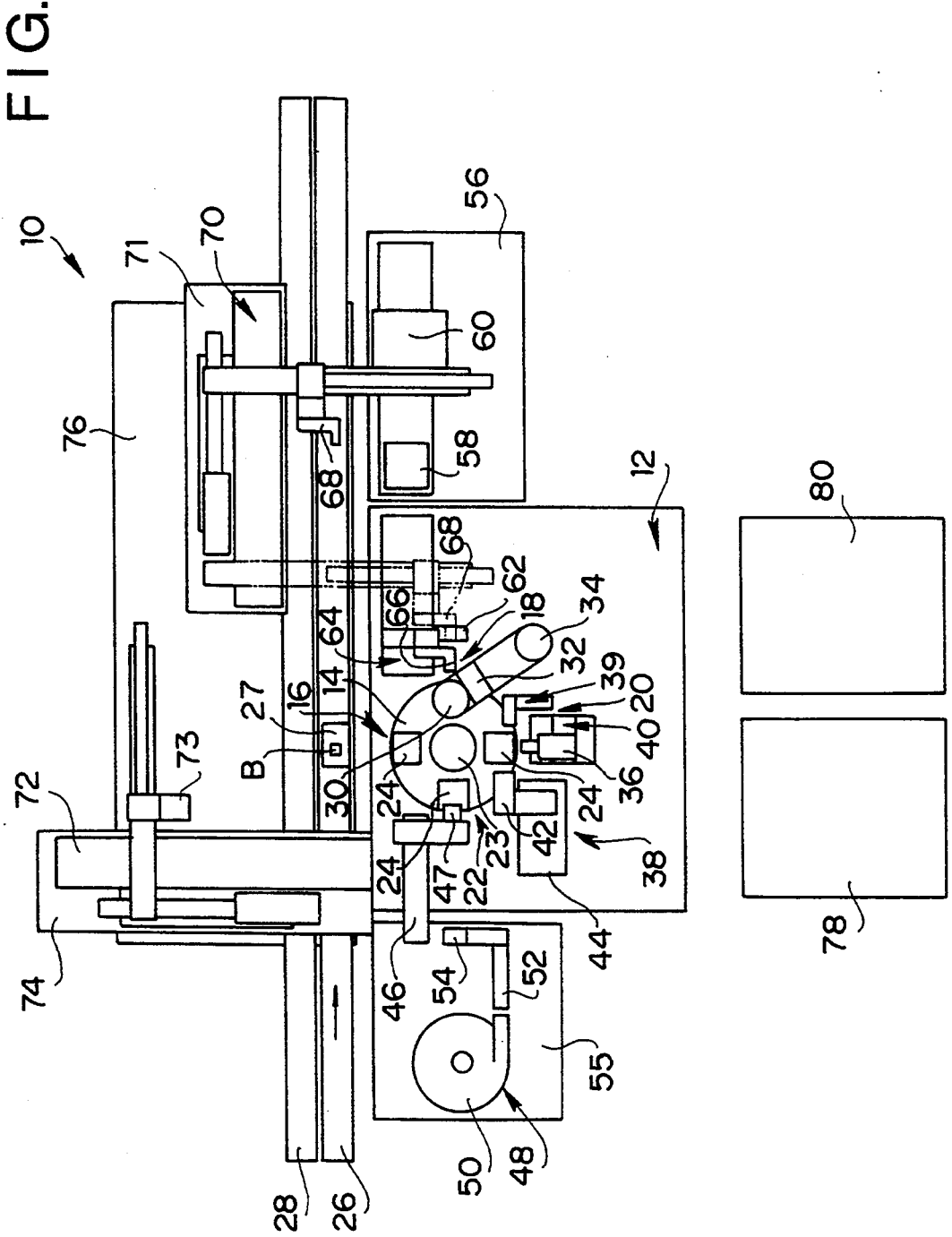
FIG. 6 is a plan view showing the overall arrangement of an ink-jet head assembling apparatus according to an embodiment of the present invention.
Figure 7:
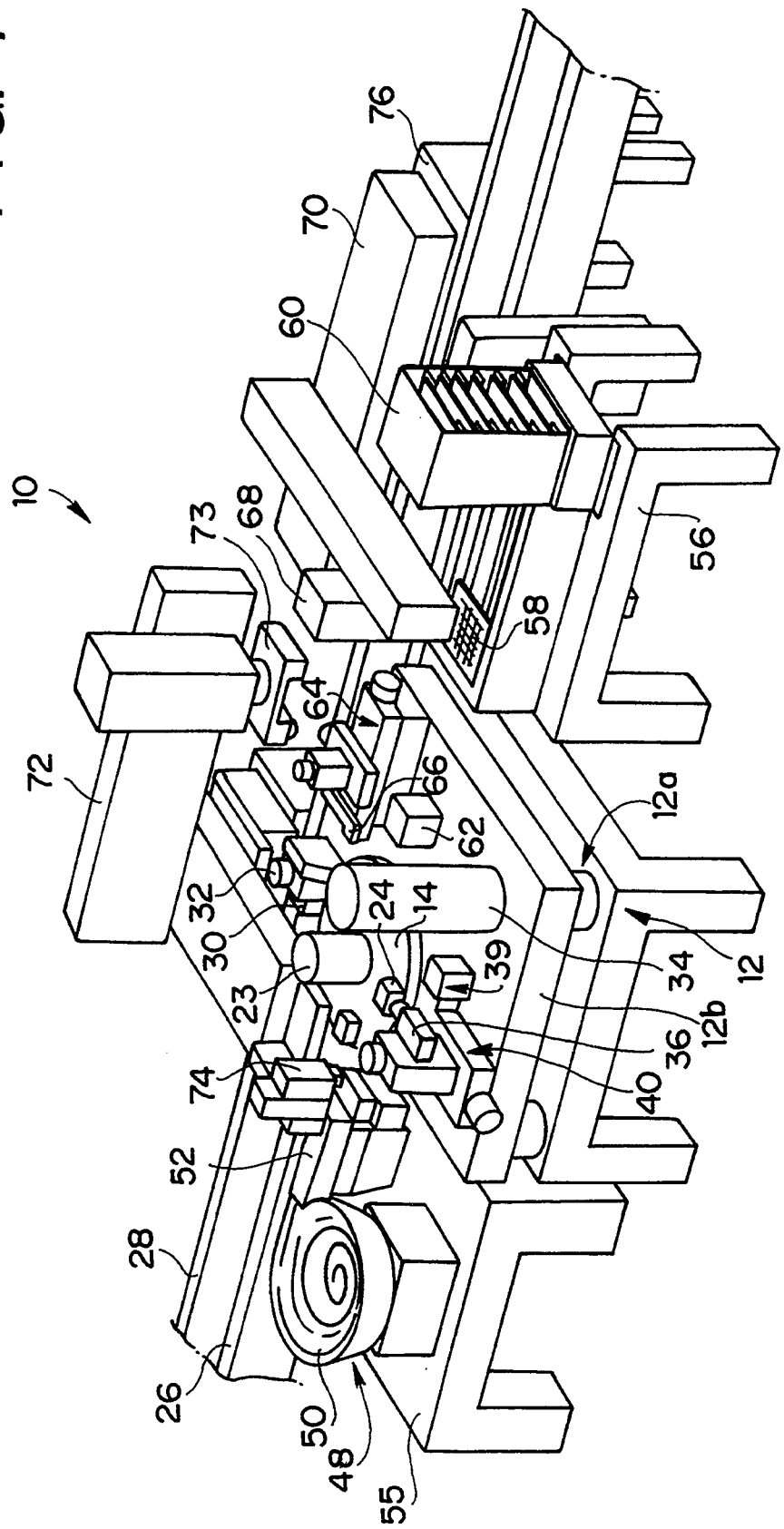
FIG. 7 is a perspective view of the ink-jet head assembling apparatus shown in FIG. 6 when viewed from obliquely above.

FIG. 6 is a plan view showing the overall arrangement of the assembling apparatus 10, and FIG. 7 is a perspective view of FIG. 6 when viewed from obliquely above. The overall arrangement of the assembling apparatus 10 will be described below with reference to FIGS. 6 and 7.

In FIGS. 6 and 7, a stand 12 serving as the foundation of the assembling apparatus 10 is placed on the floor surface of, e.g., a factory, and is constituted by placing a platen 12b on an anti-vibration mechanism 12a. A high-precision rotary index table (to be simply referred to as an index table hereinafter) 14 which is rotated in a horizontal plane is placed at substantially the central portion of the upper surface of the stand 12. This index table 14 is constituted by placing a disk-like rotary table having a diameter of 400 mm on a column having a diameter of 250 mm. First to fourth work stations 16 to 22 are arranged at positions, which are obtained by equally dividing the circumference of a circle at 90°-intervals, around the index table 14 on the stand 12. A work station located at the upper side in FIG. 6 is the first work station 16, the second work station 18 is located at a position rotated clockwise through 90° from the position of the first work station 16, the third work station 20 is located at a position rotated through another 90°, and the fourth work station 22 is located at a position rotated through another 90°. The index table 14 is rotated and aligned (indexed) at 90°-intervals in correspondence with the positions of the first to fourth work stations 16 to 22, and the alignment precision (index precision) is set to be ±1" with very high precision.

A rotary mechanism 23 is arranged on the central portion of the index table 14. The rotary mechanism 23 supplies compressed air to air cylinders, and the like on the index table 14, and extracts electrical signals from sensors arranged on the index table 14.

Four clamp jigs 24 each for clamping the base plate 101 attached with the heater board 102 are arranged on the outer periphery of the upper surface of the index table 14 at 90°-intervals in correspondence with the first to fourth stations 16 to 22.

In the first work station 16, a work, more specifically, the base plate 101 attached with the heater board 102, which is conveyed from the left to the right in FIG. 6 by a conveyor belt 26 arranged adjacent to the first work station 16, is transferred from a pallet 27 onto the clamp jig 24 by an NC auto hand 72 (to be described later). At the same time, a finished product detached from the clamp jig 24 is transferred onto the pallet 27 on the conveyor belt 26. Note that a return belt 28 for returning the empty pallet 27 is arranged adjacent to the conveyor belt 26.

In the second work station 18, the position of the heater board 102 clamped on the clamp jig 24 is measured, and the top plate 104 is fed onto the heater board 102. The second work station 18 is provided with a first ITV camera 30 for observing the heater board 102 from above so as to measure the position of the heater board 102. The first ITV camera 30 is attached to a column 34 via a stage 32 for vertically moving the first ITV camera 30 so as to focus on the upper surface of the heater board 102.

In the third work station 20, an operation for adjusting the position of the top plate 104 fed in the second work station 18 with respect to the heater board 102 is performed. In order to perform the position adjustment of the top plate 104, the third work station 20 is provided with a second ITV camera 36 for observing the positions of the ejection orifices 106 formed on the orifice plate 108 of the top plate 104 from the front side, a position adjustment mechanism 38 for performing the position adjustment of the top plate 104 in practice on the basis of the visual information from the second ITV camera 36, and a butting mechanism 39 for butting the top plate 104 against the position adjustment mechanism 38. The second ITV camera 36 is mounted on the stand 12 via a stage 40 for horizontally moving the ITV camera 36 so as to focus on the surface of the orifice plate 108 of the top plate 104. The position adjustment mechanism 38 is constituted by an adjustment rod 42 which contacts the top plate 104 to push it, and a stage 44 for moving the adjustment rod 42 to a required position.

In the fourth work station 22, an operation for fixing the top plate 104 aligned in the third work station 20 to the heater board 102 (base plate 101) is performed. In order to fix the top plate 104 to the heater board 102, the fourth work station 22 is provided with an auto hand 46 for attaching a pressing spring 120 (to be described in detail later) for fixing the top plate 104, and a feed mechanism 48 for feeding the pressing spring 120 to the auto hand 46. The auto hand 46 comprises a finger unit 47 at its distal end portion. The feed mechanism 48 is constituted by a vibration type ball feeder 50, a vibration type linear feeder 52, and a separation mechanism 54. These feeders and mechanism are arranged on a stand 55. The auto hand 46 chucks the pressing spring 120 separated by the separation mechanism 54 using its finger unit 47, conveys the chucked spring to the position of the clamp jig 24, and attaches the spring to the top plate 104 and the base plate 101.

A stand 56 is placed at the right-hand side of the stand 12, and a tray stocker 60 which stores a large number of trays 58 each storing top plates 104 is placed on the stand 56. A tray 58 is fed from the tray stocker 60 to a position at the left-hand side of the tray stocker 60, as needed. The top plates 104 are picked up by an NC auto hand 70 (to be described later) one by one from the tray 58.

A temporary aligning base 62 for temporarily aligning the top plate 104 is arranged at a position, adjacent to the second work station 18, on the stand 12. The top plate 104 is temporarily placed on the temporary aligning base 62 after it is picked up from the tray 58 by a finger unit 68 of the NC auto hand 70. The top plate 104 placed on the temporary aligning base 62 is conveyed from the temporary aligning base 62 onto the clamp jig 24 by a finger unit 66 arranged on the stand 12 via a stage 64, which is movable in a horizontal plane, and the top plate 104 is placed on the heater board 102. At this time, the top plate 104 is aligned with considerably high precision on the temporary aligning base, and the position of the top plate 104 is adjusted by moving the stage 64 in correspondence with the position of the heater board 102 with reference to the aligned position during the convey step. Therefore, when the top plate 104 is placed on the heater board 102, the top plate 104 has already been substantially precisely aligned with the heater board 102.

The NC auto hand 70 comprising the finger unit 68 at its distal end portion is arranged at a position opposing the stand 12 to sandwich the conveyor belt 26 and the return belt 28 therebetween. The NC auto hand 70 is mounted on a stand 76 via a mounting base 71. The finger unit 68 of the NC auto hand 70 grasps one top plate 104 stored in the tray 58, and places it on the above-mentioned temporary aligning base 62.

The NC auto hand 72 for supplying the base plate 101 attached with the heater board 102 from the pallet 27 onto the clamp jig 24 indexed to the position corresponding to the first work station 16 is arranged at the left-hand side of the NC auto hand 70. The NC auto hand 72 comprises a finger unit 73 at its distal end portion. The NC auto hand 72 simultaneously performs an operation for detaching a finished product from the clamp jig 24 and transferring it onto the pallet 27. The NC auto hand 72 is mounted on the stand 76 via a mounting base 74.

Note that a controller 78 for controlling the operations of the entire assembling apparatus 10 and an image processor 80 for analyzing images picked up by the first and second ITV cameras 30 and 36 are arranged outside the stand 12.

<Arrangement near Index Table>

Figure 8:
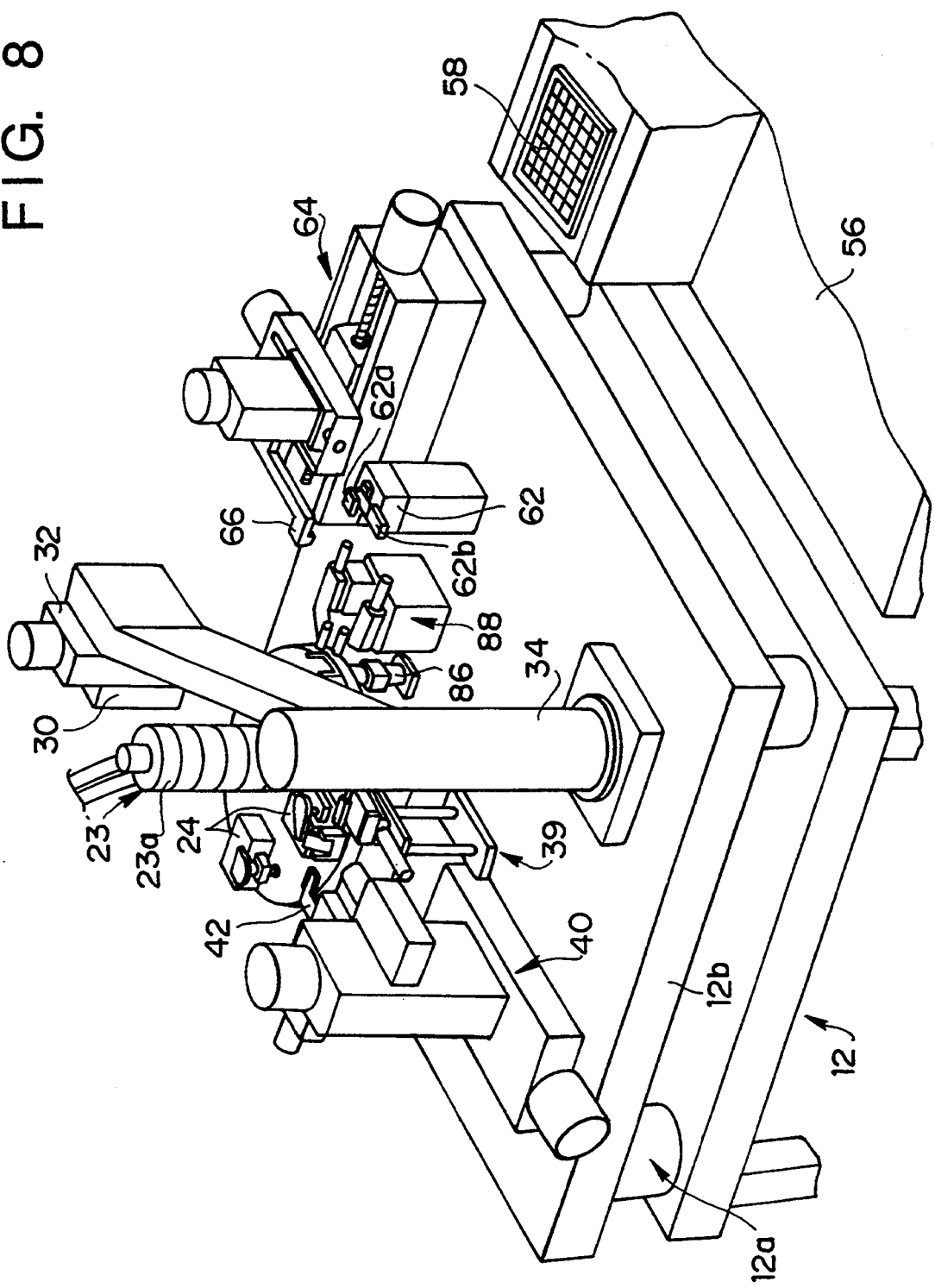
FIG. 8 is a partial enlarged perspective view of an index table portion shown in FIG. 7.

FIG. 8 is a partial enlarged view of the index table portion shown in FIG. 7.

In FIG. 8, the rotary mechanism 23 arranged at the central portion of the index table 14 is constituted by a plurality of stacked ring-like electrodes 23a, as shown in FIG. 8, and contacts (not shown) arranged to contact the outer circumferential surfaces of the electrodes 23a. When the index table 14 is rotated, and the ring-like electrodes 23a are rotated, the contacts are always in contact with the electrodes 23a. With this rotary mechanism 23, the sensors on the index table 14 and an external device exchange electrical signals. The rotary mechanism 23 also has a function of supplying compressed air to the air cylinders arranged on the index table 14.

Two actuators 62a and 62b are arranged on the temporary aligning base 62, and are used for temporarily aligning the top plate 104 on the temporary aligning base 62.

In this assembling apparatus 10, as described above, the base plate 101 attached with the heater board 102 is clamped on the clamp jig 24 in the first work station 16, and the top plate 104 is placed on the heater board 102 in the second work station 18. The clamp jig 24 comprises an upper pressing member 82 and a front pressing member 84 (see FIG. 9) for clamping the top plate 104 onto the heater board 102. As will be described in detail later, the upper and front pressing members 82 and 84 are respectively driven by first and second driving mechanisms 86 and 88 arranged outside the index table 14, i.e., on the stand 12.

These first and second driving mechanisms 86 and 88 are arranged at a position corresponding to the second work station 18, as shown in FIG. 8. Another first driving mechanism 86 is also arranged at a position corresponding to the fourth work station 22 in addition to the second work station 18. Another second driving mechanism 88 is also arranged at a position corresponding to the first work station 16.

<Clamp Jig>

The structure of each clamp jig 24 arranged on the index table 14 will be described below with reference to FIGS. 9 to 12. Note that the x-, y-, and z-axes are defined, as shown in FIG. 9, for the sake of simplicity.

Figure 9:
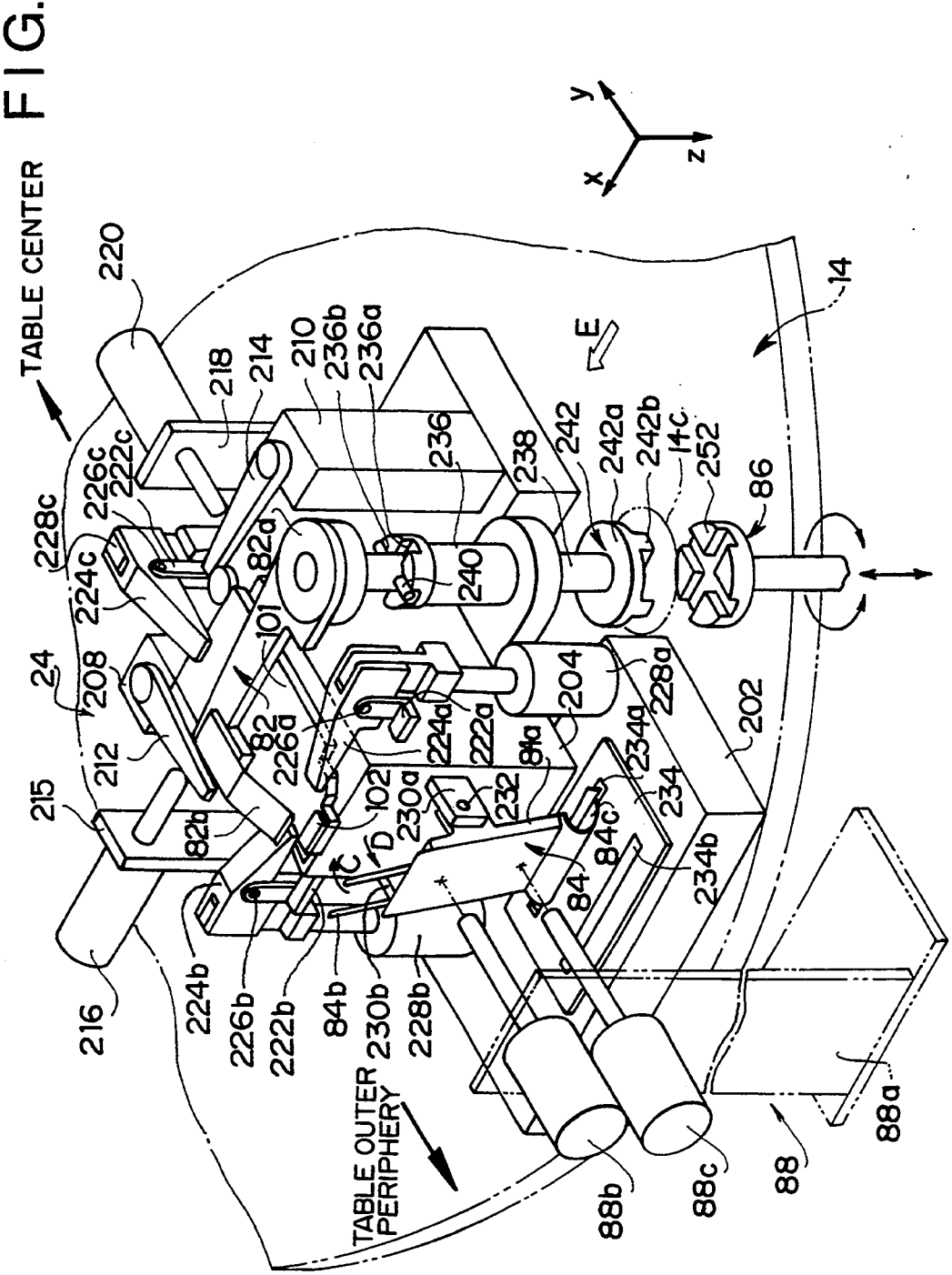
FIG. 9 is a perspective view showing the structure of a clamp jig.
Figure 10:
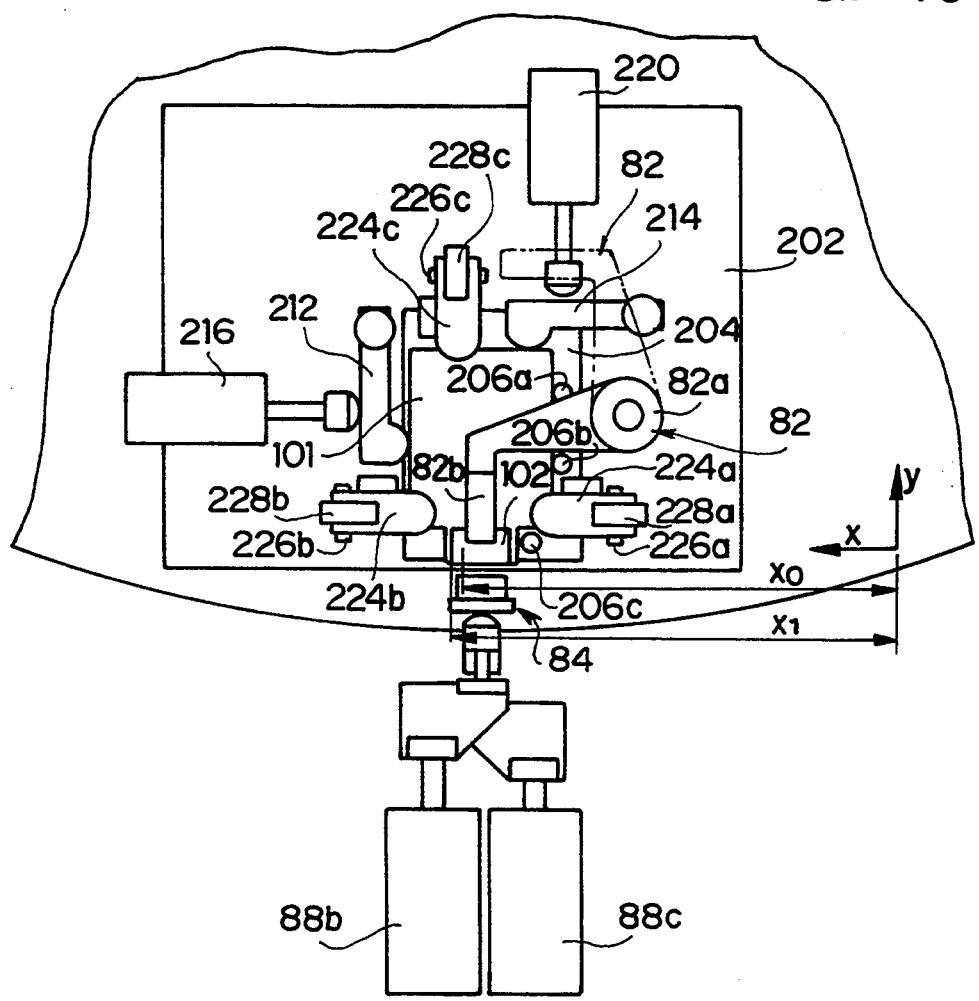
FIG. 10 is a top plan view of FIG. 9.
Figure 11:
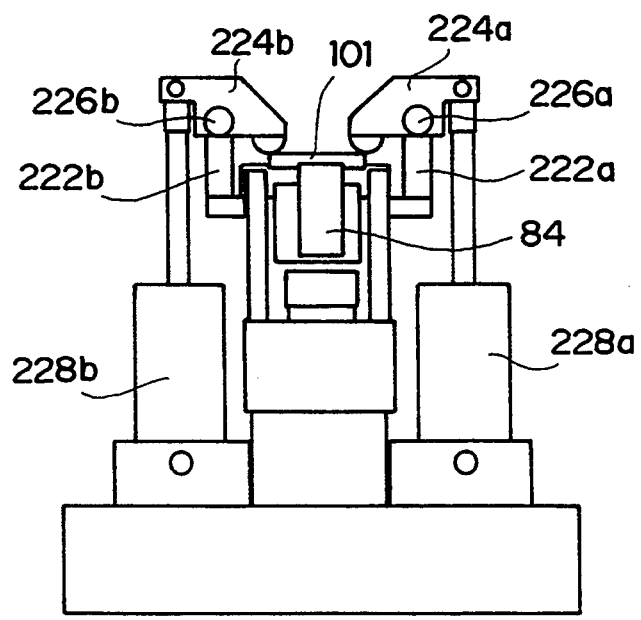
FIG. 11 is a front view of the clamp jig when it is viewed from the outer peripheral side of the index table.

In FIG. 9, a base plate 202 as the base of the clamp jig 24 is fixed on the upper surface of the index table 14. A jig main body 204 having a substantially rectangular pallellopiped shape is fixed on the upper surface of the base plate 202. The base plate 101 attached with the heater board 102 is clamped on the upper surface of the jig main body 204. As shown in FIG. 10 as a top plan view of FIG. 9, three aligning pins 206a, 206b, and 206c for aligning the base plate 101 with the jig main body 204 are arranged on the upper surface of the jig main body 204.

Columns 210 and 208 stand upright at the right- and left-hand sides of the jig main body 204 on the base plate 202. Of these two columns, on the upper surface of the column 208, an x-clamp lever 212 for biasing the base plate 101 in the direction along the x-axis against the aligning pins 206a and 206b is mounted to be pivotal in a horizontal plane. The x-clamp lever 212 is driven by an air cylinder 216 attached to a support board 215 standing upright on the base plate 202 so as to be pivoted counterclockwise when viewed from above, thereby urging the base plate 101 against the aligning pins 206a and 206b. The x-clamp lever 212 is biased by a spring (not shown) to be pivoted clockwise. Thus, in an inactive state of the air cylinder 216 (i.e., a state wherein a piston rod is retracted), the back surface of the x-clamp lever 212 contacts the distal end portion of the piston rod of the air cylinder 216, and the lever 212 is aligned at this position.

On the upper surface of the column 210, a y-clamp lever 214 for biasing the base plate 101 in the direction along the y-axis against the aligning pin 206c is mounted to be pivotal in a horizontal plane. The y-clamp lever 214 is driven by an air cylinder 220 attached to a support board 218 standing upright on the base plate 202 so as to be pivoted counterclockwise when viewed from above, thereby urging the base plate 101 against the pin 206c. The x-clamp lever 214 is biased by a spring (not shown) to be pivoted clockwise. Thus, in an inactive state of the air cylinder 220 (i.e., a state wherein a piston rod is retracted), the back surface of the y-clamp lever 214 contacts the distal end portion of the piston rod of the air cylinder 220, and the lever 214 is aligned at this position.

Support portions 222a and 222b are formed at two side positions of the jig main body 204. Z-clamp levers 224a and 224b are attached to these support portions 222a and 222b to be respectively rotatable about rotational shafts 226a and 226b in a vertical plane. The distal end portions of piston rods of air cylinders 228a and 228b attached on the base plate 202 are connected to the proximal end portions of these z-clamp levers 224a and 224b. When the piston rods of the air cylinders 228a and 228b are retracted, the distal end portions of the z-clamp levers 224a and 224b are moved upward, and the base plate 101 is unclamped from the jig main body 204. When the piston rods of the air cylinders 228a and 228b are pushed out, the distal end portions of the z-clamp levers 224a and 224b are moved downward, and the base plate 101 is clamped since it is urged against the upper surface of the jig main body 204.

A support portion 222c is formed behind the jig main body 204. A z-clamp lever 224c is attached to the support portion 222c to be rotatable about a rotational shaft 226c in a vertical plane. The distal end portion of a piston rod of an air cylinder 228c attached on the base plate 202 is connected to the proximal end portion of the z-clamp lever 224c. Therefore, when the piston rod of the air cylinder 228c is retracted, the distal end portion of the z-clamp lever 224c is moved upward, and the base plate 101 is set in an unclamp state. On the other hand, when the piston rod of the air cylinder 228c is pushed out, the distal end portion of the z-clamp lever 224c is moved downward, and the base plate 101 is clamped since it is urged against the upper surface of the jig main body 204.

Support boards 230a and 230b are fixed to the front portion (the outer peripheral side of the index table) of the jig main body 204, and the front pressing member 84 is rotatably supported between these support boards 230a and 230b via a rotational shaft 232. The front pressing member 84 has a function of pressing, from the front side, the orifice plate 108 of the top plate 104 placed on the upper surface of the heater board 102 so as to clamp the top plate 104 on the heater board 102. The front pressing member 84 is constituted by a front pressing member main body 84a supported by the rotational shaft 232, a pressing spring 84b attached to the front pressing member main body 84a, and a click spring 84c attached to the lower end of the front pressing member main body 84a.

Figure 12:
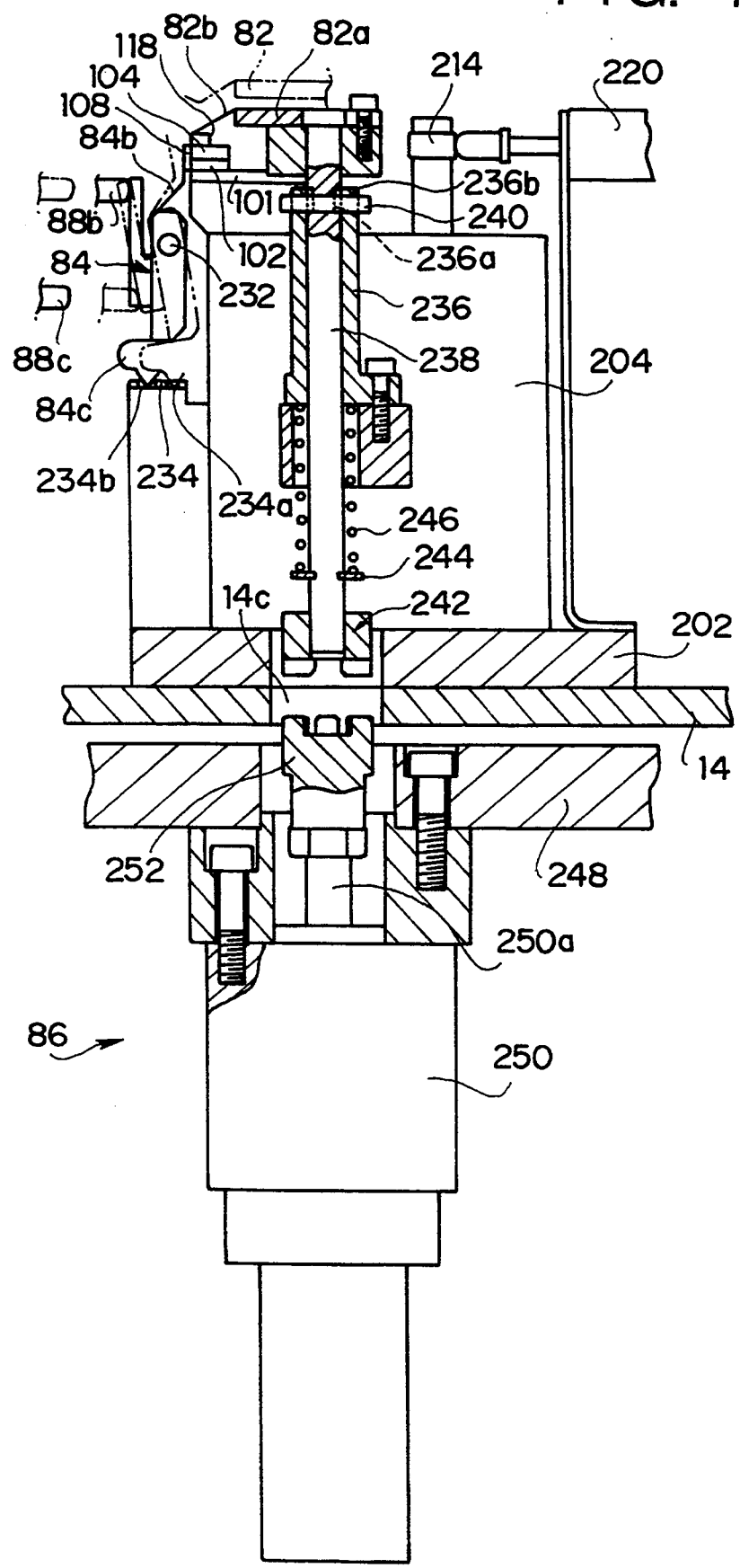
FIG. 12 is a side sectional view of FIG. 9 from the direction of an arrow E in FIG. 9.

In the state illustrated in FIG. 9, the clamp state of the top plate 104 by the front pressing member 84 is released, and when a triangular bent portion at the lower end of the click spring 84c is fitted in a first groove 234a of a grooved plate 234 mounted on the base plate 202, the posture of the front pressing member 84 is held. FIG. 12 shows the side view of the front pressing member 84 in this state, as indicated by an alternate long and two short dashed line.

As described above, the second driving mechanism 88 for switching the front pressing member 84 between a state wherein the top plate 104 is clamped on the heater board 102, and an unclamp state is mounted on the stand 12. The second driving mechanism 88 is mainly constituted by a support board 88a fixed on the stand 12, and two air cylinders 88b and 88c mounted on the support board 88a. More specifically, when the upper air cylinder 88b is operated to push out its piston rod, the front pressing member 84 is pivoted about the rotational shaft 232 since it is pushed by the distal end portion of the piston rod, and its upper end portion is moved in the direction of an arrow C. With this operation, the orifice plate 108 of the top plate 104 is urged against and clamped on the heater board 102 by the distal end portion of the pressing spring 84b (a state indicated by a solid line in FIG. 12). Upon pivotal movement of the front pressing member 84, the lower end portion of the click spring 84c is disengaged from the first groove 234a of the grooved plate 234, and is then fitted in a second groove 234b, so that the front pressing member 84 is held in a clamping state of the top plate 104.

When the lower air cylinder 88c is operated to push out its piston rod, the front pressing member 84 is pivoted about the rotational shaft 232 since it is pushed by the distal end portion of the piston rod, and its upper end portion is moved in the direction of an arrow D, thus attaining an unclamp state shown in FIG. 9.

Note that the second driving mechanism 88 is provided at positions corresponding to the first and second stations 16 and 18 on the stand 12.

An upper pressing mechanism for pressing the top plate 104 against the heater board 102 from above will be described below with reference to FIG. 9 and FIG. 12 as a side sectional view of FIG. 9 from the direction of an arrow E.

A substantially cylindrical guide cylinder 236 is fixed aside the jig main body 204, so that its central axis extends along the vertical direction. A slide shaft 238 is fitted in the guide cylinder 236, and the above-mentioned upper pressing member 82 is attached to the upper end portion of the slide shaft 238. The upper pressing member 82 is constituted by an upper pressing member main body 82a fixed to the upper end portion of the slide shaft 238, and a pressing spring 82b attached to the distal end portion of the upper pressing member main body 82a.

An aligning pin 240 is mounted on a portion at a level slightly lower than that of the upper end portion of the slide shaft 238 to horizontally extend through the slide shaft 238, and orthogonal grooves 236a and 236b to be engaged with the aligning pin 240 are formed on the upper end portion of the guide cylinder 236. When the aligning pin 240 is fitted in one of these two grooves 236a and 236b, the rotation of the upper pressing member 82 in a horizontal plane is restricted.

In the state shown in FIG. 9, the aligning pin 240 is fitted in one groove 236a, and the upper pressing member 82 urges the top plate 104 from above against the heater board 102 by the pressing spring 82b at its distal end portion (clamp position). From this state, the slide shaft 238 is temporarily slid upward to disengage the aligning pin 240 from the groove 236a. Thereafter, the upper pressing member 82 is rotated clockwise (when viewed from above) through 90°, and the aligning pin 240 is fitted in a groove 240b. Thus, the upper pressing member 82 is held in a state wherein the pressing operation on the top plate 104 is released, as indicated by an alternate long and two short dashed line in FIG. 12 (escape position).

A mechanism for rotating the upper pressing member 82 between the clamp position and the escape position will be described in more detail below.

A coupling member 242 consisting of a disk-shaped main body portion 242a and a cross-shaped projecting portion 242b projecting downward from the main body portion 242a is attached to the lower end of the slide shaft 238. The coupling member 242 is engaged with a cross-shaped recess portion of a coupling member 252 provided to the first driving mechanism 86 arranged on the stand 12.

The above-mentioned arrangement will be described in more detail below with reference to FIG. 12. In FIG. 12, a compression spring 246 is inserted between the lower end of the guide cylinder 236 and a fixing ring 244 attached to the slide shaft 238. The slide shaft 238 is always biased downward by the compression spring 246 with respect to the guide cylinder 236. By the biasing force of the compression spring 246, the aligning pin 240 attached to the slide shaft 238 is fitted in one of the two grooves 236a and 236b, thereby restricting the horizontal rotation of the upper pressing member 82. Since the biasing force of the compression spring 246 is set to be larger than that of the pressing spring 82b, when the upper pressing member 82 is located at the clamp position shown in FIG. 9, the aligning pin 240 is fitted in the groove 236b, and the top plate 104 is urged against the heater board 102 by the biasing force generated by flexure of the pressing spring 82b.

As described above, the first driving mechanism 86 is arranged on the stand 12. The first driving mechanism 86 is constituted by a main body portion 248 fixed to the stand 12, and a rotary air cylinder 250, which is attached to the main body portion 248, so that its central axis extends in the vertical direction. The rotary air cylinder 250 has a function of vertically moving its piston rod 250a, and a function of rotating the piston rod 250a.

As described above, the coupling member 252 formed with the cross-shaped recess portion is attached to the distal end portion of the piston rod 250a of the rotary air cylinder 250. As shown in FIG. 12, when the piston rod 250a of the rotary air cylinder 250 is retracted, the slide shaft 238 is located at its lower position by the biasing force of the compression spring 246, and the aligning pin 240 is fitted in one of the grooves 236a and 236b. From this state, when the rotary air cylinder 250 is operated to push out its piston rod 250a upward, the coupling member 252 is moved upward via a through hole 14c formed in the index table 14, and the coupling members 252 and 242 are engaged with each other. Thus, the piston rod 250a and the slide shaft 238 are allowed to rotate together. At the same time, upon upward movement of the piston rod 250a, the slide shaft 238 is moved upward against the biasing force of the compression spring 246, and the aligning pin 240 is disengaged from the groove 236a or 236b, thus allowing rotation of the slide shaft 238. In this state, the piston rod 250a of the rotary air cylinder 250 is rotated through 90°, and the piston rod 250a is retracted, so that the upper pressing member 82 is moved between the clamp position and the escape position and is aligned at one of these positions.

Note that the first driving mechanism 86 is arranged at positions corresponding to the second and fourth work stations 18 and 22 on the stand 12.

<Outline of Top Plate Attaching Operation>

In the assembling apparatus 10 with the above-mentioned arrangement, an attaching operation of the top plate 104 to the base plate 101 (heater board 102) is performed as outlined below.

In the second work station 18, when the top plate 104 is placed on the heater board 102, the first and second driving mechanisms 86 and 88 are operated, so that the top plate 104 is clamped on the heater board 102 by the upper and front pressing members 82 and 84. Upon completion of the clamp operation, the top plate 104 is held in a state wherein it is clamped on the heater board 102, and the first and second driving mechanisms 86 and 88 are disengaged from the index table 14. Therefore, the index table 14 is rotatable.

In this state, the index table 14 is rotated, and the clamp jig 24 on which the top plate 104 and the heater board 102 are placed is moved to and aligned with the position corresponding to the third work station 20. In the third work station 20, the position of the top plate 104 is finely adjusted by the position adjustment mechanism 38 with respect to the heater board 102 while it is urged against the heater board 102 by the upper and front pressing members 82 and 84. Since the upper and front pressing members 82 and 84 urge the top plate 104 against the heater board 102 by spring forces, the top plate 104 can be finely moved with respect to the heater board 102, thus allowing the position adjustment of the top plate 104.

When the position adjustment of the top plate 104 with respect to the heater board 102 is completed in the third work station 20, the index table 14 is rotated, and the clamp jig 24 is rotated to the position corresponding to the fourth work station 22. In the fourth work station 22, the first driving mechanism 86 is operated to cause the upper pressing member 82 to escape from the position above the top plate 104. Then, the auto hand 46 attaches the pressing spring 120 to the base plate 101, thereby fixing the top plate 104 to the heater board 102. Thereafter, the clamp jig 24 is moved to the position corresponding to the first work station 16. The second driving mechanism 88 is operated to cause the front pressing member 84 to escape from the clamp position of the top plate 104.

In this manner, in the assembling apparatus 10 of this embodiment, the members for actually clamping the top plate 104 are provided to each clamp jig 24 on the index table 14, and the mechanisms for driving the clamp members are arranged outside the index table 14.

<Third Work Station>

Figure 13:
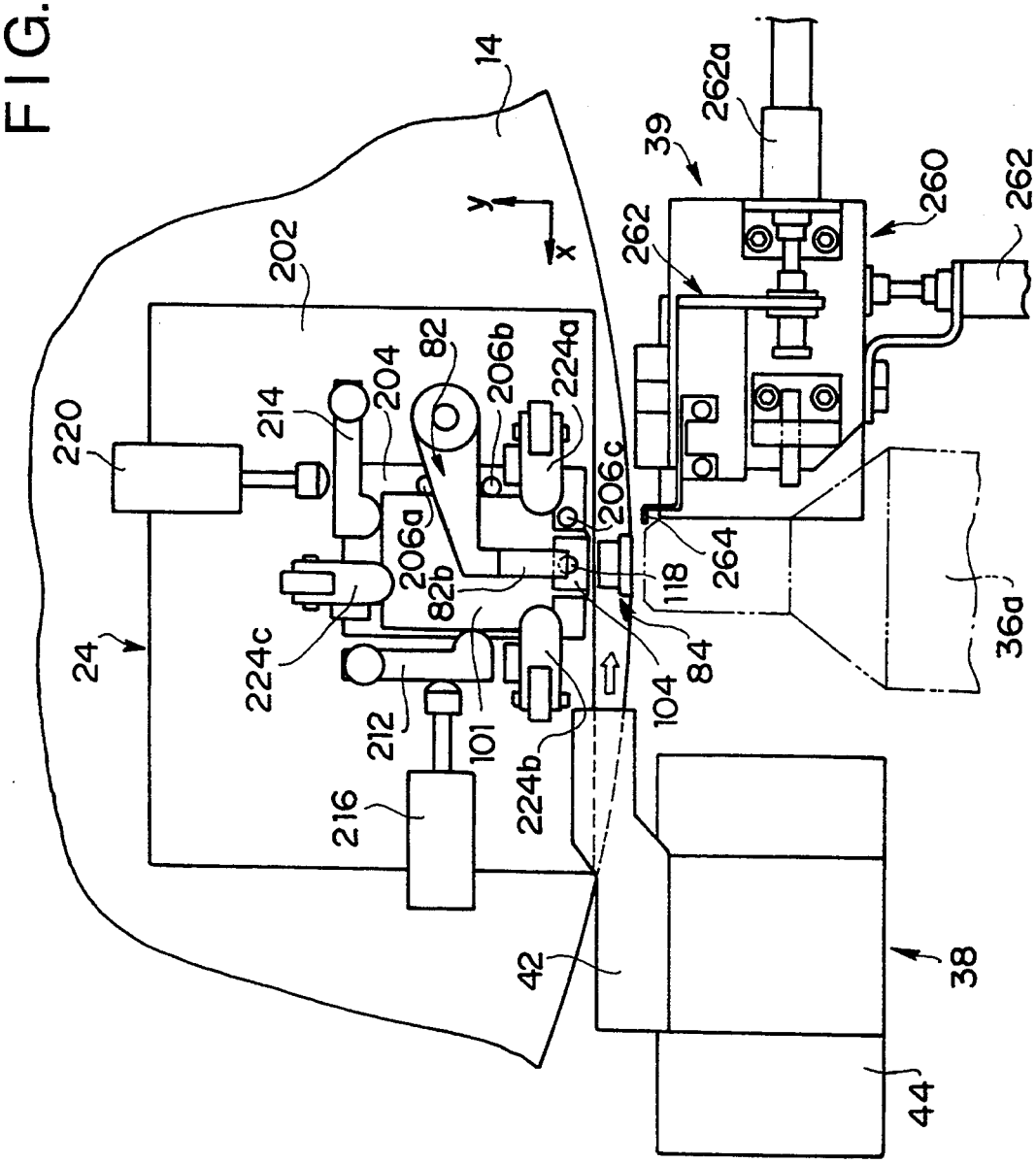
FIG. 13 is a plan view partially showing the arrangement of a third work station.

FIG. 13 is a plan view partially showing the arrangement of the third work station 20.

In FIG. 13, an objective lens 36a of the second ITV camera 36 for observing the positions of the ejection orifices 106 formed on the orifice plate 108 of the top plate 104, as described above, is arranged at a position, in front of the clamp jig 24, on the stand 12. The position adjustment mechanism 38 for adjusting the position of the top plate 104 with respect to the heater board 102 is arranged at a position, at the left-hand side of the objective lens 36a, on the stand 12. As described above, the position adjustment mechanism 38 is constituted by the stage 44 which is arranged on the stand 12, and is movable along the x-axis, and the adjustment rod 42 attached to the stage 44.

The butting mechanism 39 for butting the top plate 104 against the adjustment rod 42 is arranged at a position at the right-hand side of the objective lens 36a. The butting mechanism 39 is constituted by a y-slide table 260 which is arranged on the stand 12, and is slidable in the y-direction, an x-slide table 262 which is arranged on the y-slide table 260 and is slidable in the x-direction, and a leaf spring 264 attached to the x-slide table 262. Therefore, the leaf spring 264 is movable in the x- and y-directions by the x- and y-slide tables 262 and 260, and when the index table 14 is rotated, the leaf spring 264 is escaped to a position separate from the clamp jig 24, as shown in FIG. 13. After the index table 14 is stopped, and the clamp jig 24 is aligned with the position corresponding to the third work station 20, the leaf spring 264 is moved in the y-direction (upward direction in FIG. 13) to a right neighboring position of the top plate 104 the clamp jig 24. Then, the leaf spring 264 is moved in the x-direction (leftward in FIG. 13) to push the top plate 104 from the right to the left in FIG. 13, thereby butting the left end face of the top plate 104 against the distal end portion of the adjustment rod 42.

At this time, the position of the adjustment rod 42 of the position adjustment mechanism 38 is adjusted, so that the position of the top plate 104 is slightly shifted leftward from a required position when the left end face of the top plate 104 contacts the end face of the adjustment rod 42. For this reason, the position adjustment mechanism 38 moves the adjustment rod 42 rightward by a small amount to adjust the top plate 104 to the required position with respect to the heater board 102. In this manner, the top plate 104 is precisely aligned with the heater board.

<Arrangement State of Air Cylinders>

Figure 14:
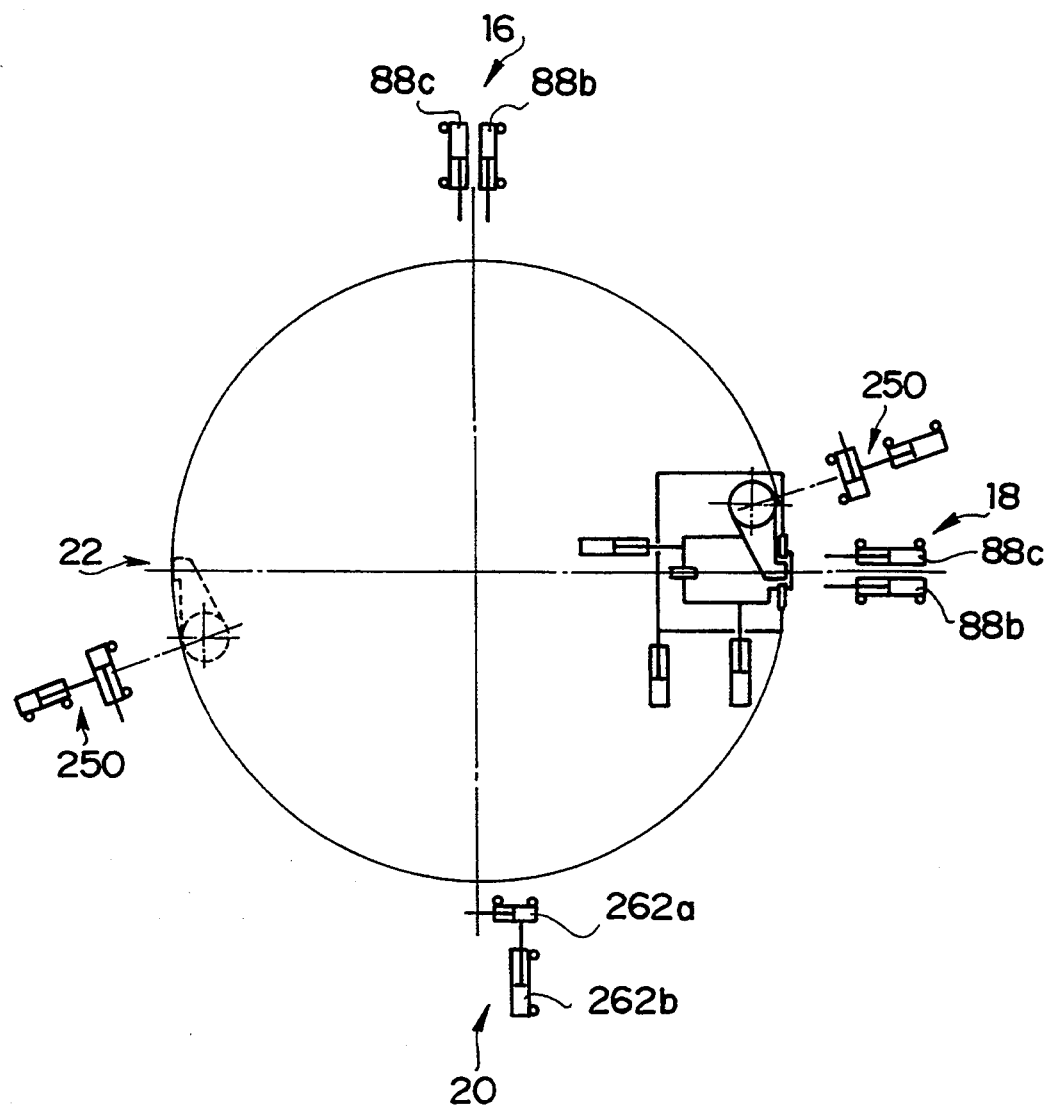
FIG. 14 is a view showing an arrangement state of air cylinders in the assembling apparatus of the embodiment shown in FIG. 6.

FIG. 14 illustrates the arrangement state of the air cylinders on the assembling apparatus 10. On the first work station 16, the air cylinders 88b and 88c constituting the second driving mechanism 88 for driving the front pressing member 84 are arranged. On the second work station 18, the air cylinders 88b and 88c constituting the second driving mechanism 88 are arranged like in the first work station 16, and the rotary air cylinder 250 constituting the first driving mechanism 86 is arranged. On the third work station 20, air cylinders 262a and 262b for driving the x- and y-slide tables 262 and 260 constituting the butting mechanism 39 are arranged. On the fourth work station, the rotary air cylinder 250 constituting the first driving mechanism 86 is arranged.

<Arrangement of Assembling Finger Unit 47 for Pressing Spring 120>

The arrangement of the assembling finger unit 47 for the pressing spring 120 will be described below with reference to FIGS. 15 and 16.

Figure 15:
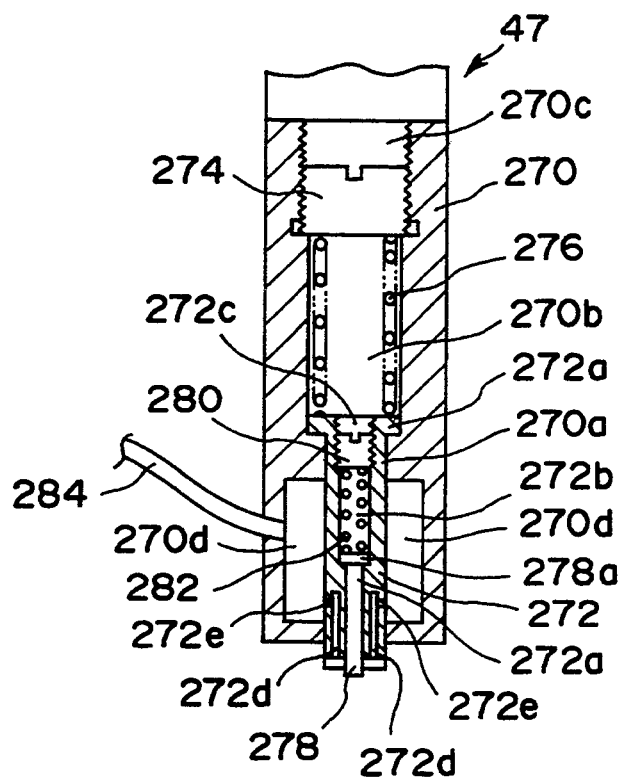
FIG. 15 is a sectional view showing the arrangement of an assembling finger.
Figure 16:
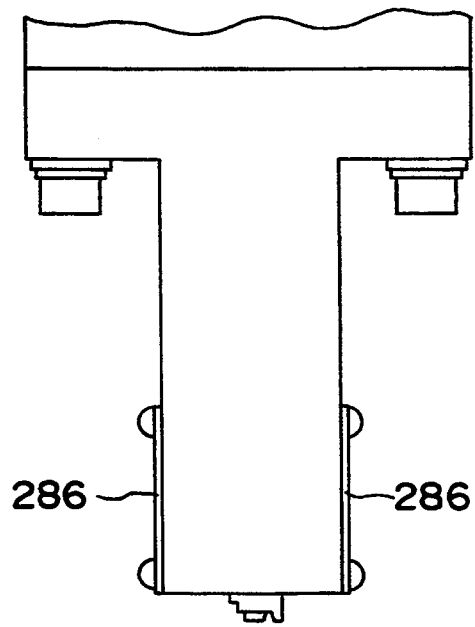
FIG. 16 is a side view of the assembling finger.

FIG. 15 is a side sectional view showing the arrangement of the assembling finger unit 47. In FIG. 15, a main body 270 of the finger unit 47 is formed into a shape extending in the vertical direction, and a through hole is formed along its central axis. The through hole has three different diameters at different portions. A substantially cylindrical push-in member 272 is vertically slidably fitted in the inner circumferential surface of a hole 270a located at the lowermost position and having the smallest diameter. A flange portion 272a is formed on the upper end portion of the push-in member 272, and the outer circumferential surface of the flange portion 272a is engaged with the inner circumferential surface of a hole 270b having the middle diameter. A female screw portion is formed on the inner circumferential surface of a hole 270c located at the uppermost position of the main body 270, and having the largest diameter. The hole 270c is sealed by a stopper member 274 formed with a male screw which is threadably engaged with the female screw portion of the hole 270c. A compression spring 276 is arranged between the lower surface of the stopper member 274 and the upper surface of the flange portion 272a of the push-in member 272, and the push-in member is always biased downward. The lower surface of the flange portion 272a of the push-in member 272 contacts the lower surface of the hole 270b having the middle diameter, so that the push-in member 272 can be prevented from being disengaged from the main body 270.

On the other hand, a through hole having three different diameters at different portions is also formed in the central portion of the push-in member 272. A substantially columnar guide rod 278 is vertically slidably inserted in the inner circumferential surface of a hole 272a which is located at the lowermost position of the push-in member 272 and has the smallest diameter. A flange portion 278a is formed on the upper end portion of the guide rod 278, and the outer circumferential surface of the flange portion 278a is engaged with the inner circumferential surface of a hole 272b having the middle diameter. A female screw portion is formed on the inner circumferential surface of a hole 272c which is located at the uppermost position of the push-in member 272 and has the largest diameter. This hole 272c is sealed by a set screw 280 which is threadably engaged with the female screw portion of the hole 272c. A compression spring 282 is arranged between the lower surface of the set screw 280 and the upper surface of the flange portion 278a of the guide rod 278, and the guide rod 278 is always biased downward. The lower surface of the flange portion 278a of the guide rod 278 contacts the lower surface of the hole 272b having the middle diameter, so that the guide rod 278 can be prevented from being disengaged from the push-in member 272.

Tunnel-like holes 272d for chucking the pressing spring 120 are formed in the push-in member 272 at two neighboring positions of the through hole. The upper portion of each hole 272d is connected to a through hole 272e open to the outer wall of the push-in member 272. On the other hand, a through hole 270d is formed in the main body 270 to surround the opening portions of the through holes 272e. The two end portions of the through hole 270d are sealed by seal members 286, as shown in FIG. 16. A pipe 284 for drawing air by suction from the distal end portions of the holes 272d via the through holes 270d and 270e is connected to the main body 270.

<Attaching Operation of Pressing Spring 120>

An operation for attaching the pressing spring 120 to the top plate 104 and the base plate 101 by the finger unit 47 with the above-mentioned arrangement will be described below with reference to FIGS. 17 to 21.

Prior to the description of a procedure for attaching the pressing spring 120, the shape of the pressing spring 120 will be described below.

Figure 17:
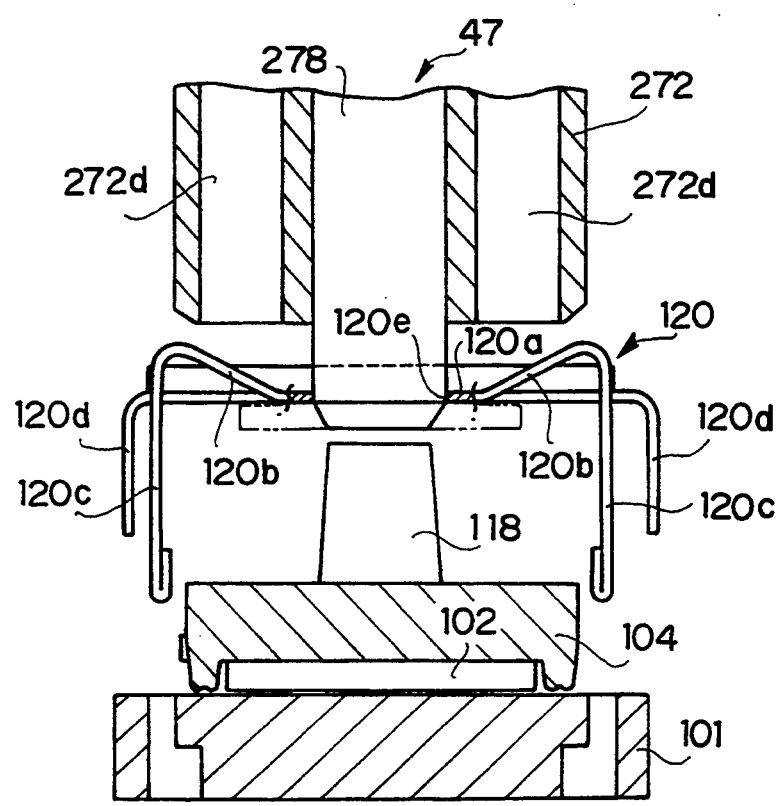
FIG. 17 is a view for explaining a pressing spring attaching operation.
Figure 18:
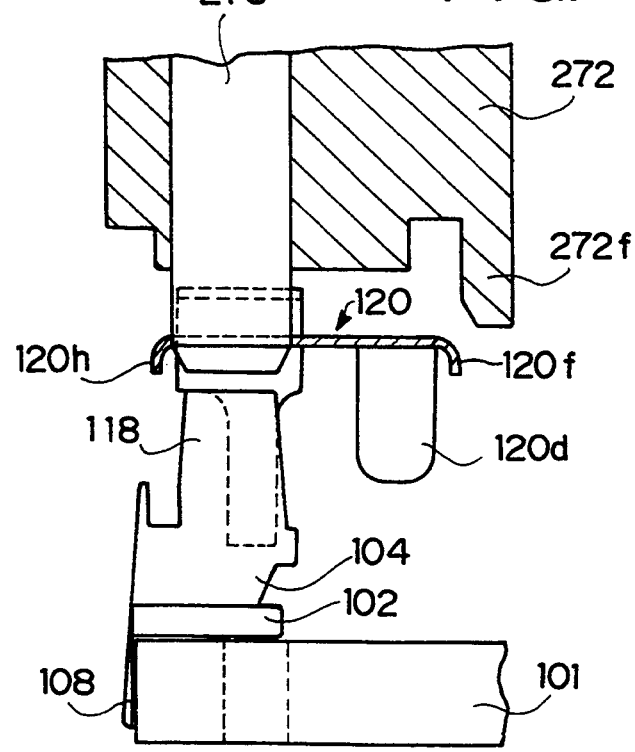
FIG. 18 is a view for explaining the pressing spring attaching operation.

As shown in FIGS. 17 and 18, the pressing spring 120 is mainly constituted by a flat portion 120a formed at a central portion, upward bent portions 120b connected to the two ends of the flat portion 120a, lock portions 120c connected to the upward bent portions 120b and bent downward, and anti-falling portions 120d connected to the rear portion of the flat portion 120a and bent in a direction to depend from the flat portion 120a. A through hole 120e for receiving the ink reception port 118 of the top plate 104 is formed at the central portion of the flat portion 120a.

The operation for attaching the pressing spring 120 will be described below.

The attaching operation of the pressing spring 120 is performed by the fourth work station 22. In a state shown in FIG. 17, the top plate 104 has already been precisely aligned with the heater board 102. The upper pressing member 82 is escaped from the position above the top plate 104, and the top plate 104 is clamped on the heater board 102 by the front pressing member 84 alone from the front side of the top plate 104.

As shown in FIG. 17, air is drawn by suction from the distal end portions of the holes 272d of the push-in member 272 of the finger unit 47, thereby chucking the pressing spring 120 at the distal end portion of the finger unit 47. At this time, the distal end portion of the guide rod 278 is inserted in the through hole 120e of the pressing spring 120, and the position of the pressing spring 120 with respect to the finger unit 47 in a horizontal plane is restricted. A projection 272f is formed at the distal end portion of the push-in member 272, as shown in FIG. 18, and contacts a depending portion 120f formed on the rear end portion of the pressing spring 120, so as to prevent the pressing spring 120 from being rotated in a horizontal plane.

In a state wherein the finger unit 47 chucks the pressing spring 120 in this manner, the finger unit 47 is moved downward from the position shown in FIG. 17 with respect to the top plate 104. At this time, the distal end portion of the guide rod 278 contacts the upper end portion of the ink reception port 118 of the top plate 104, and urges the top plate 104 against the heater board 102 from above, thus clamping the top plate 104. More specifically, in the state wherein the distal end portion of the guide rod 278 contacts the upper end portion of the ink reception port 118, the top plate 104 is clamped to the heater board 102 by the front pressing member 84 and the guide rod 278.

Figure 19:
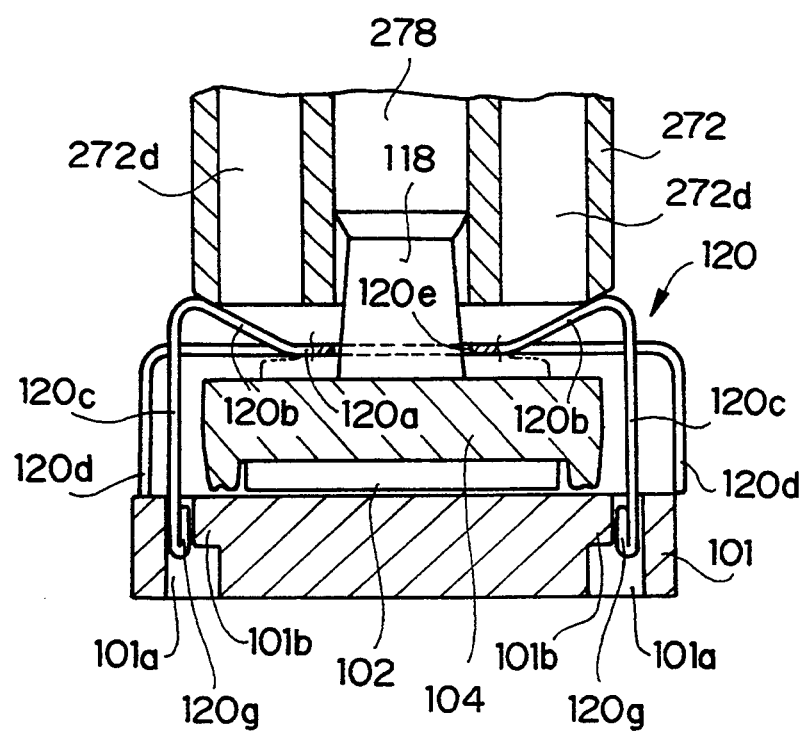
FIG. 19 is a view for explaining the pressing spring attaching operation.

When the finger unit 47 is further moved downward from this state, as shown in FIG. 19, the guide rod 278 is pushed upward against the biasing force of the compression spring 282, and is pushed inside the push-in member 272. With this operation, the upper ends of the upward bent portions 120b of the pressing spring 120 are pushed by the lower end of the push-in member 272, and the lower ends of the lock portions 120c are inserted in through holes 101a formed in the base plate 101.

Figure 20:
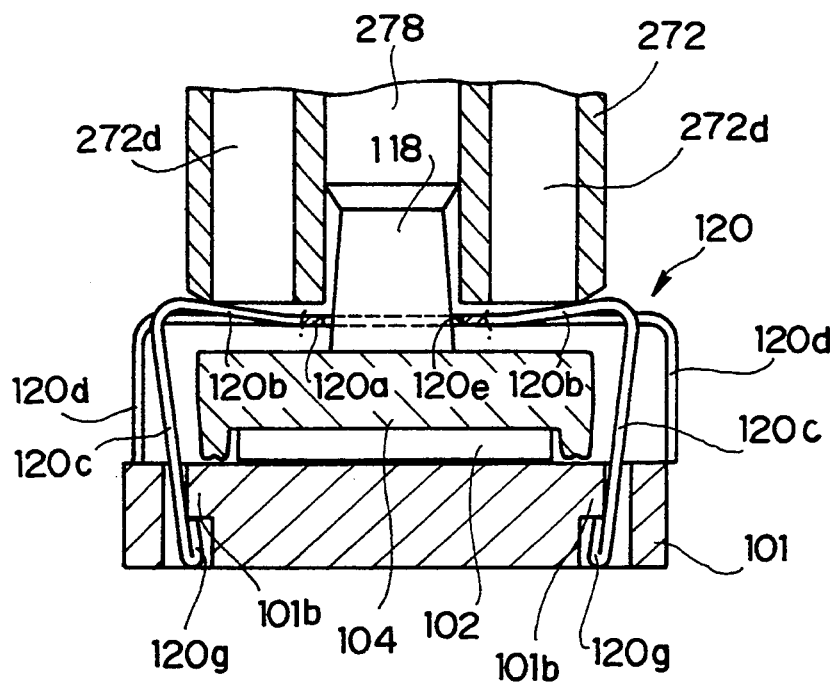
FIG. 20 is a view for explaining the pressing spring attaching operation.
Figure 21:
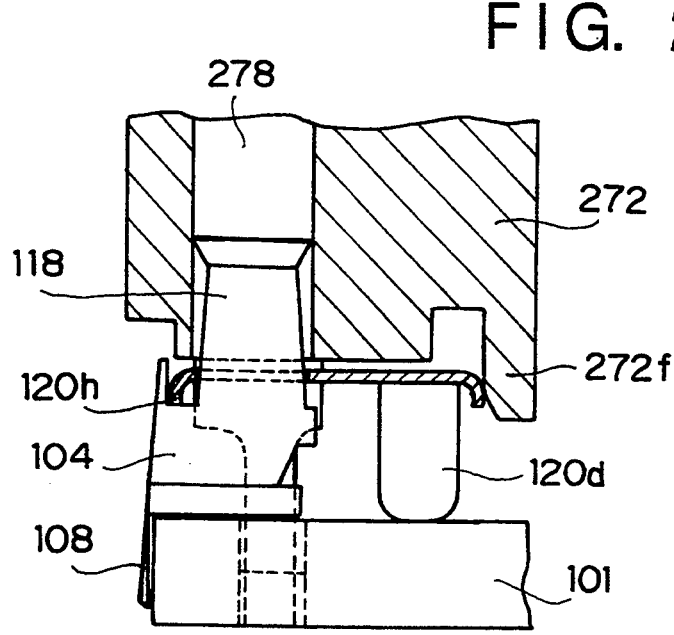
FIG. 21 is a view for explaining the pressing spring attaching operation.

When the finger unit 47 is further moved downward from this state, as shown in FIG. 20, the lower end of the push-in member 272 pushes the upward bent portions 120b of the pressing spring 120 downward, and bent portions 120g formed at the lower ends of the lock portions 120c of the pressing spring 120 are locked with lock portions 101b formed on the base plate 101, thus fixing the pressing spring 120 to the base plate 101. In this state, as shown in FIG. 21, a depending portion 120h formed at the front end portion of the pressing spring 120 contacts the upper surface of the top plate 104, and urges the top plate against the base plate 101 (heater board 102) from above. Thereafter, the finger unit 47 is escaped from the position above the top plate 104, thus ending the attaching operation of the pressing spring 120. In this manner, the pressing spring 120 is attached to the top plate 104 and the base plate 101.

Figure 22:
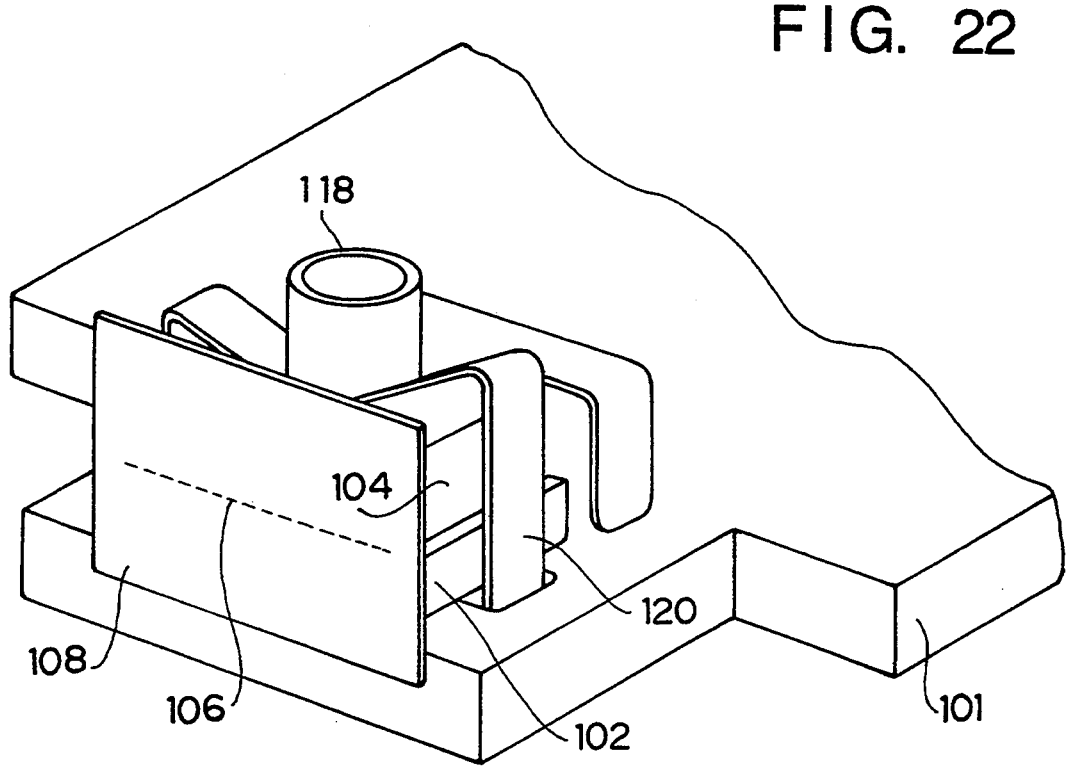
FIG. 22 is a perspective view showing a state wherein the pressing spring is attached to a base plate.

Note that FIG. 22 is a perspective view showing a state wherein the pressing spring 120 is attached to the top plate 104 and the base plate 101.

<Calibration Member>

In the assembling apparatus 10 of this embodiment, in the second work station 18, the first ITV camera 30 picks up an image of the heater board 102 from above to detect the position of the heater board 102, and in the third work station 20, the top plate 104 is aligned with the heater board based on the position information obtained by the first ITV camera 30 while an image of the top plate 104 is picked up by the second ITV camera 36 from the front side. For this purpose, the positional relationship between the first and second ITV cameras 30 and 36 must be precisely recognized. For this reason, in the assembling apparatus 10 of this embodiment, the calibration operation of these two ITV car, eras 30 and 36 is performed at every predetermined cycle. A calibration member used in this calibration operation will be described below.

Figure 23:
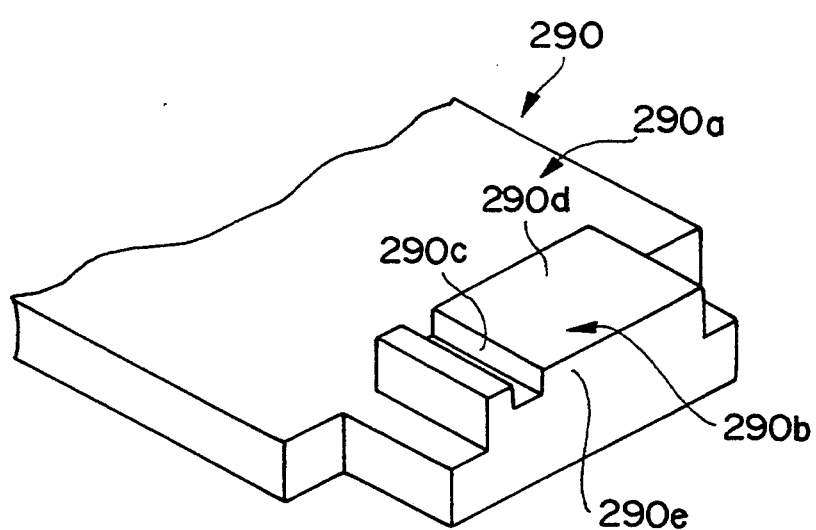
FIG. 23 is a perspective view showing the structure of a calibration member.

FIG. 23 is a perspective view showing the structure of a calibration member.

A calibration member 290 is constituted by a main body 290a formed to have the same shape as that of the base plate 101, and a calibration portion 290b formed on the main body 290a. The calibration portion 290b is formed to have substantially the same shape as that of the heater board 102, and is formed with a groove portion 290c at a position corresponding to the heaters 112 of the heater board 102. When an image of the edge portion of the groove portion 290c is picked up by the first and second ITV cameras 30 and 36, the positions of these ITV cameras 30 and 36 are calibrated. The calibration member 290 is normally arranged at a standby position outside the index table 14, and is conveyed by the NC auto hand 72 from the standby position onto the clamp jig 24 on the index table 14 at every predetermined calibration cycle. Since the main body 290a of the calibration member 290 is formed to have the same shape as that of the base plate 101, the calibration member 290 is clamped on the clamp jig 24 in the same manner as the base plate 101. The calibration operation of the first and second ITV cameras 30 and 36 is performed while the clamp jig 24 is moved from the first work station 16 to the fourth work station 22 upon rotation of the index table 14. When the index table 14 completes one revolution, and the clamp jig 24 is returned to the first work station 16, the calibration member 290 is returned to the standby position.

[Operation of Assembling Apparatus 10]

The operation of the assembling apparatus 10 with the above-mentioned arrangement will be described hereinafter.

<General Operation>

FIG. 24 is a flow chart showing the general operation of the assembling apparatus 10. An outline of the operation of the entire assembling apparatus 10 will be described below with reference to FIG. 24. Note that the steps surrounded by double lines in FIG. 24 indicate subroutines, and the contents thereof will be described in detail later after the description of the general operation.

When the assembling apparatus 10 is started, in the first work station 18, a finished product (a product in which the top plate 104 is attached onto the heater board 102) for which the assembling operation has already been completed is discharged from the position on the clamp jig 24 to the pallet 27 on the conveyor belt 26 in step S12. At the same time, an unfinished base plate 101 is transferred from the pallet 27 onto the clamp jig 24.

Parallel to the operation in the first work station 16, in the second work station 18, the first ITV camera 30 measures the position of the heater board 102 in step S16. Upon completion of the measurement of the position of the heater board 102, an operation for placing the top plate 104 on the heater board 102 is performed in step S18.

In the third work station 20, an operation for butting the top plate 104 against the adjustment rod 42 of the position adjustment mechanism 38 by the butting mechanism 39 is performed in step S20. Upon completion of this butting operation, an operation for adjusting the position of the top plate 104 with respect to the heater board 102 while measuring the position of the top plate 104 by the second ITV camera 36 is performed in step S22.

In the fourth work station 22, an operation for attaching the pressing spring 120 to the top plate 104 and the base plate 101 is performed in step S24.

The operations in the first to fourth work stations 16 to 22 are parallelly executed, and upon completion of the operations of the work stations, end signals are output from the work stations. The controller 78 checks based on these end signals output from the work stations whether or not all the operations in the first to fourth work stations 16 to 22 are completed. If it is determined in step S26 that all the operations of the first to fourth work stations 16 to 22 are completed, the controller 78 rotates the index table 14 through 90°.

Parallel to the rotation of the index table 14, the clamp operation of the base plate 101 fed onto the clamp jig 24 is performed in step S28. In step S32, it is checked if both the rotation of the index table 14 and the clamp operation of the base plate 101 are completed. If it is determined in step S32 that the two operations are completed, the operations for one cycle are ended, and the clamp jig 24 on which a finished product is placed is indexed to the position of the first work station 16. The flow then returns to the start node, and the work stations repeat the same operations, thus sequentially discharging finished products onto the pallet 27.

<Subroutines>

The subroutines will be described in detail hereinafter. In the following description, one of the four clamp jigs arranged on the index table 14 is taken as an example, and the contents of the subroutines will be described according to the flow of the assembling operations while this clamp jig is moved from the first work station to the fourth work station.

{Operation of First Work Station}

(Discharging Operation of Finished Product & Feed Operation of Unfinished Product)

Prior to the description of the flow chart showing the discharge operation of a finished product and the feed operation of an unfinished product, the basic operations for discharging a finished product and for feeding an unfinished product will be described below.

Figure 25A:
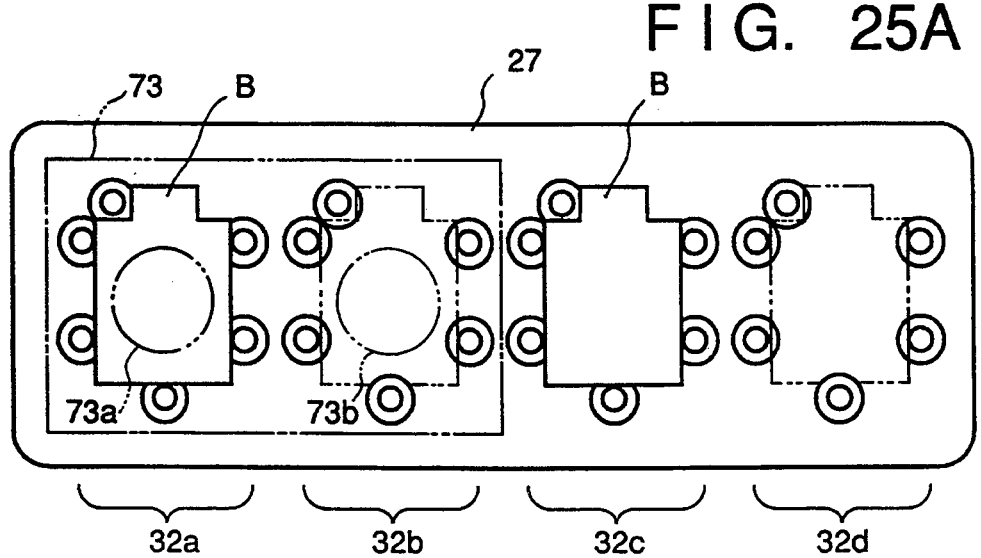
FIGS. 25(a) to 25(c) are views for explaining a fetching operation of unfinished products from a pallet, and a discharging operation of finished products onto a pallet.
Figure 25B:
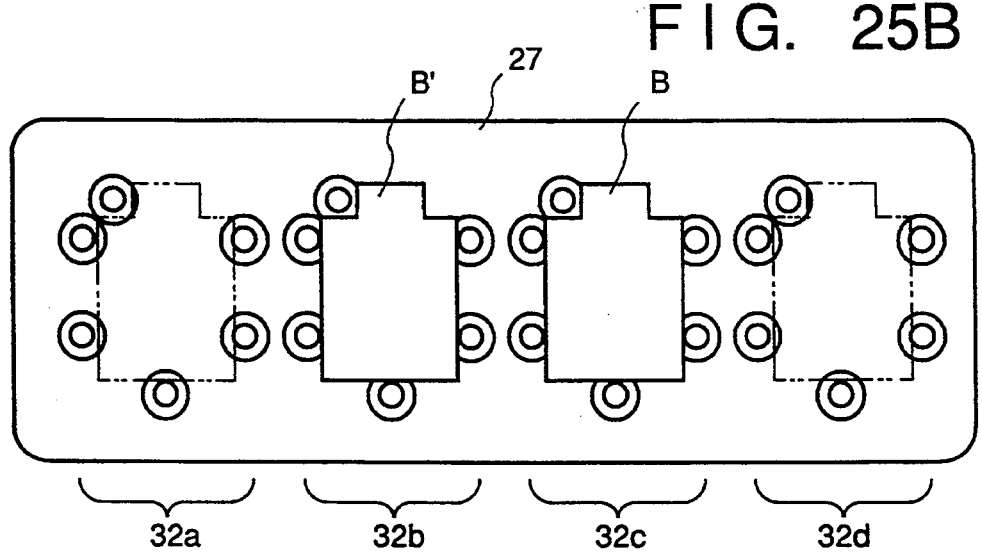
Figure 25C:
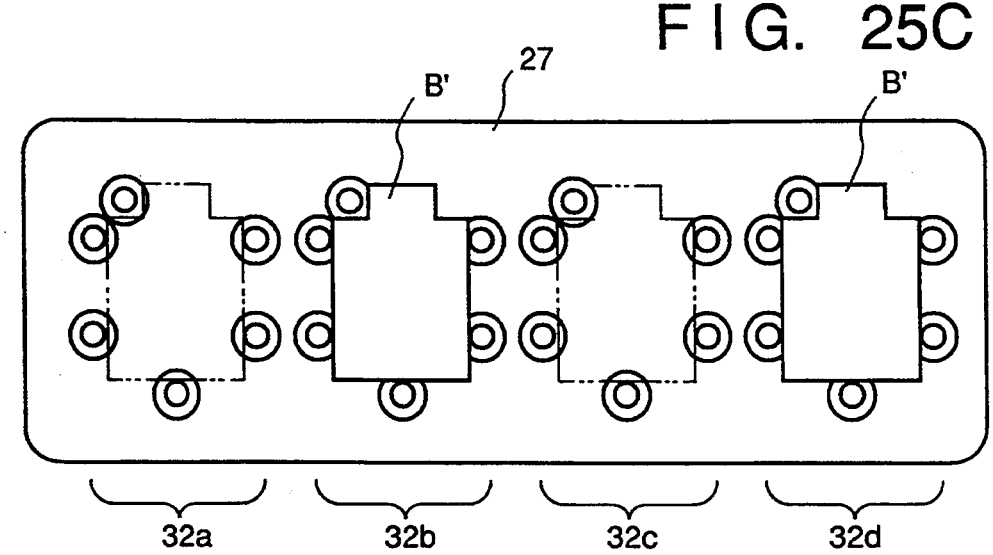

In FIG. 6, the base plate 101 attached with the heater board 102 is conveyed on the pallet 27 from the left to the right of the conveyor belt 26 in FIG. 6, and is aligned with the position, corresponding to the first work station 16, on the stand 12. As shown in FIGS. 25(a) to 25(c), the pallet 27 has four aligning portions 32a to 32d for aligning the base plate 101. Unfinished base plates 101 (B) on which top plates 104 are to be attached are placed on the two aligning portions 32a and 32c of the four aligning portions. On the two remaining aligning portions 32b and 32d, finished products B' (base plates 101 on which top plates 104 have already been attached) detached from the clamp jigs 24 are placed, as will be described later.

This state will be described in more detail below. In FIG. 25(a) showing a state wherein the pallet 27 is conveyed to the position corresponding to the first work station 16, unfinished base plates 101 are denoted by reference symbol B. The finger unit 73 attached to the distal end of the NC auto hand 72 comprises a first finger 73a for chucking an unfinished base plate 101 and feeding it to the clamp jig 24, and a second finger 73b for chucking a finished product from the clamp jig 24 and placing it on the pallet 27. The first and second fingers 73a and 73b are arranged at neighboring positions, and as indicated by alternate long and two short dashed circles in FIG. 25(a), when the first finger 73a is located at the position corresponding to the aligning portion 32a, the second finger 73b is located at the position corresponding to the aligning portion 32b. More specifically, the chucking operation of the unfinished product B and the discharging operation of the finished product B' can be performed in a single aligning operation.

Therefore, in a normal cycle, the finger unit 73 is aligned above the pallet 27 in a state wherein it chucks a finished product B', which has been assembled in the immediately preceding working cycle, and picks up an unfinished product B by the first finger 73a from the aligning portion 32a on the pallet 27 and at the same time, places the finished product B' chucked by the second finger 73b on the aligning portion 32b. Thereafter, the finger unit 73 is moved to the position above the clamp jig 24, and the second finger 73b is aligned with a position immediately above the finished product B'. The second finger 73b chucks the finished product B', and detaches it from the clamp jig 24. Then, the second finger 73b is escaped from the position immediately above the clamp jig 24, and the first finger 73a is aligned with the position immediately above the clamp jig 24 to place the unfinished product B on the clamp jig 24. More specifically, the feed operation of an unfinished product B onto the clamp jig 24 and the discharging operation of a finished product B' to the pallet 27 are simultaneously performed. Therefore, upon completion of these operations, the pallet 27 has a state, as shown in FIG. 25(b).

When the same operation is performed for an unfinished product B placed on the aligning portion 32c, two finished products B' are placed on the pallet 27, as shown in FIG. 25(c). The pallet 27 is conveyed to the next step. In this case, two works are placed on the pallet 27. However, two works are set in association with a working machine in the next step, and when this embodiment is practiced alone, only one work may be set. The simultaneous pick-up/place operations of an unfinished product B and a finished product B' on the pallet 27 is performed to shorten the tact time. If the tact time has a sufficient margin, the pick-up/place operation may be performed by a single finger.

With the above-mentioned operations, a finished product B' is placed on the pallet 27, and an unfinished product B is fed from the pallet 27.

Figure 26:
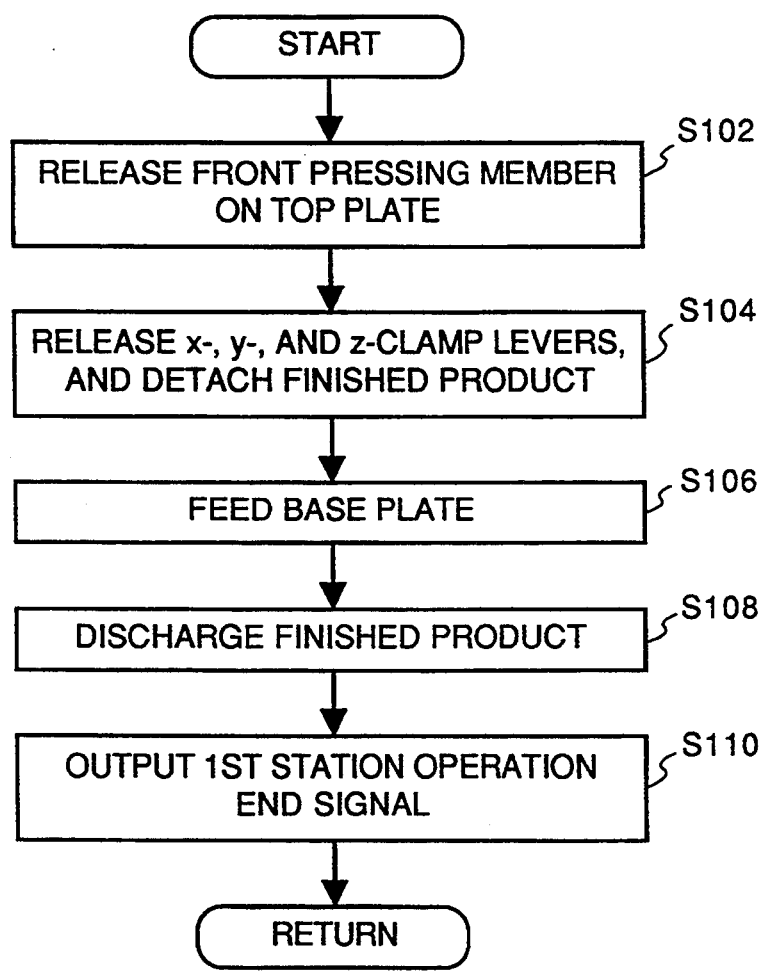
FIG. 26 is a flow chart for explaining a feed operation of unfinished products and a discharging operation of finished products in a first work station.

Under the above-mentioned conditions, the discharging operation of a finished product and the feed operation of an unfinished product in the first work station 16 will be described below with reference to the flow chart shown in FIG. 26.

Upon completion of the assembling operation for one cycle, the index table 14 is rotated clockwise in FIG. 6 through 90°, and the clamp jig 24 is moved from the fourth work station 22 to the first work station 16 and is aligned with the first work station 16. At this time, the upper pressing member 84 for clamping the top plate 104 from above has already been set at the escape position in the fourth work station 22. This operation will be described later in the description of the operation in the fourth work station 22.

In step S102, the air cylinder 88c of the second driving mechanism 88 arranged on the stand 12 in correspondence with the first work station 16 is operated to push out its piston rod, and the front pressing member pushed by this piston rod is rotated in the direction of the arrow D in FIG. 9. Thus, the pressing spring 84b is escaped from the orifice plate 108 of the top plate 104, and the top plate 104 is set in an unclamp state. At this time, the NC auto hand 72 chucks an unfinished base plate 101 (an unfinished product B shown in FIG. 25(a)) by the first finger 73a, and waits at the position above the clamp jig 24.

In step S104, the NC auto hand 72 is moved downward, and the second finger 73b of the NC auto hand 72 begins to chuck a finished product (the base plate 101 attached with the top plate 104) on the clamp jig 24. Simultaneously with the beginning of the chucking operation, the piston rods of the air cylinders 216, 220, 228a, 228b, and 228c (see FIG. 9) arranged on the clamp jig 24 are retracted to release the clamp state of the base plate 101. Therefore, the finished product is detached from the clamp jig 24 by the second finger 73b of the NC auto hand 72.

In step S106, the finger unit 73 (the first and second fingers 73a and 73b) of the NC auto hand 72 is temporarily moved upward, and thereafter, the first finger 73a, which chucks the unfinished base plate 101, is aligned with the position immediately above the clamp jig 24. The finger unit 73 is moved downward again, and the unfinished base plate 101 is released when the unfinished base plate 101 contacts the upper surface of the clamp jig 24. With this operation, the unfinished base plate 101 is placed on the clamp jig 24.

Upon completion of the place operation of the unfinished base plate 101, in step S108, the finger unit 73 is moved upward upon operation of the NC auto hand 72, is moved to the position of the pallet 27, and places the finished product on the pallet 27. Thereafter, the NC auto hand 72 outputs an end signal for informing the end of the operation in the first work station 16, and the flow then returns to the main routine.

(Aligning Operation of Base Plate 101)

Figure 27:
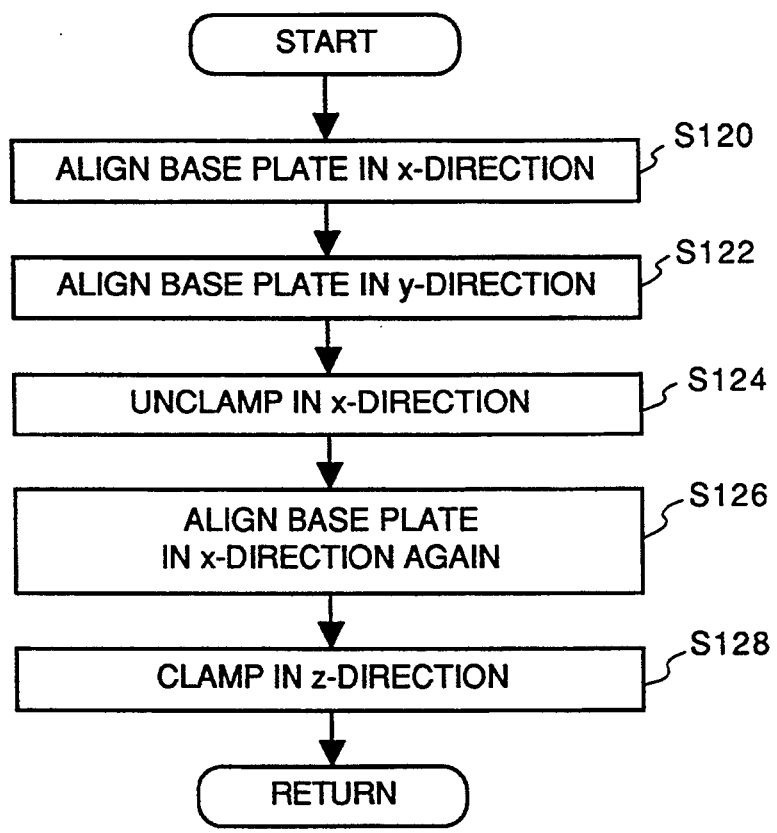
FIG. 27 is a flow chart for explaining an aligning operation of the base plate.

An aligning operation of the unfinished base plate 101 to the clamp jig 24 will be described below with reference to the flow chart shown in FIG. 27 and FIGS. 9 and 10.

In step S120, the air cylinder 216 shown in FIGS. 9 and 10 is operated to push out its piston rod forward. Thus, the x-clamp lever 212 is rotated counterclockwise to urge the base plate 101 against the aligning pins 206a and 206b, thus attaining alignment in the x-direction.

In step S122, the air cylinder 220 is operated to rotate the y-clamp lever 214 counterclockwise. Thus, the base plate 101 is pushed by the y-clamp lever 214 and is urged against the aligning pin 206c, thus attaining alignment in the y-direction.

In step S124, the piston rod of the air cylinder 216 is retracted to temporarily release the clamp state by the x-clamp lever 212.

In step S126, the piston rod of the air cylinder 216 is pushed out to cause the x-clamp lever 212 to urge the base plate 101 against the aligning pins 206a and 206b again. With the operations in steps S120 to S126, the base plate 101 is aligned with respect to the clamp jig 24. In this manner, when the clamp state in the x-direction is temporarily released after the clamp operation in the y-direction is performed, and then, the clamp operation in the x-direction is performed, the reproducibility of aligning precision upon aligning the base plate 101 with the clamp jig 24 can be improved.

Upon completion of the aligning operations in the x- and y-directions, as described above, in step S128, the air cylinders 228a, 228b, and 228c are operated to rotate the z-clamp levers 224a, 224b, and 224c about their rotational shafts 226a, 226b, and 226c, thereby clamping the base plate 101 in the z-direction.

In this manner, the aligning operation of the base plate 101 with the clamp jig 24 is ended.

{Operation during Movement from First Work Station to Second Work Station}

Next, the index table 14 is rotated. In this case, as described above, compression air is supplied to the air cylinders 216, 220, 228a, 228b, and 228c via the rotary mechanism 23 arranged at the center of the index table 14. For this reason, during rotation of the index table 14, compression air can be supplied to the air cylinders 216, 220, 228a, 228b, and 228c to operate them. Therefore, in order to shorten the tact time, the above-mentioned aligning operation is started when the index table 14 stands still, and is continuously performed during rotation of the index table 14. Therefore, when the base plate 101 is placed on the clamp jig 24, and the finger unit 73 is escaped from the clamp jig 24, the rotation of the index table 14 can be immediately started. However, since the index table cannot be rotated until all the operations of the remaining second to fourth work stations 18 to 22 are completed, the index table 14 does not start rotation simultaneously when the finger unit 73 is escaped from the clamp jig 24 in the first work station 16.

{Operation in Second Work Station}

The assembling operation in the second work station 18 will be described below. As described above, the base plate 101 is aligned with the clamp jig 24 while it is moved from the first work station 16 to the second work station 18, and when the clamp jig 24 is stopped at the position corresponding to the second work station 18, the base plate 101 is clamped by the clamp jig 24 in an aligned state.

(Measurement of Position of Heater Board)

Figure 28:
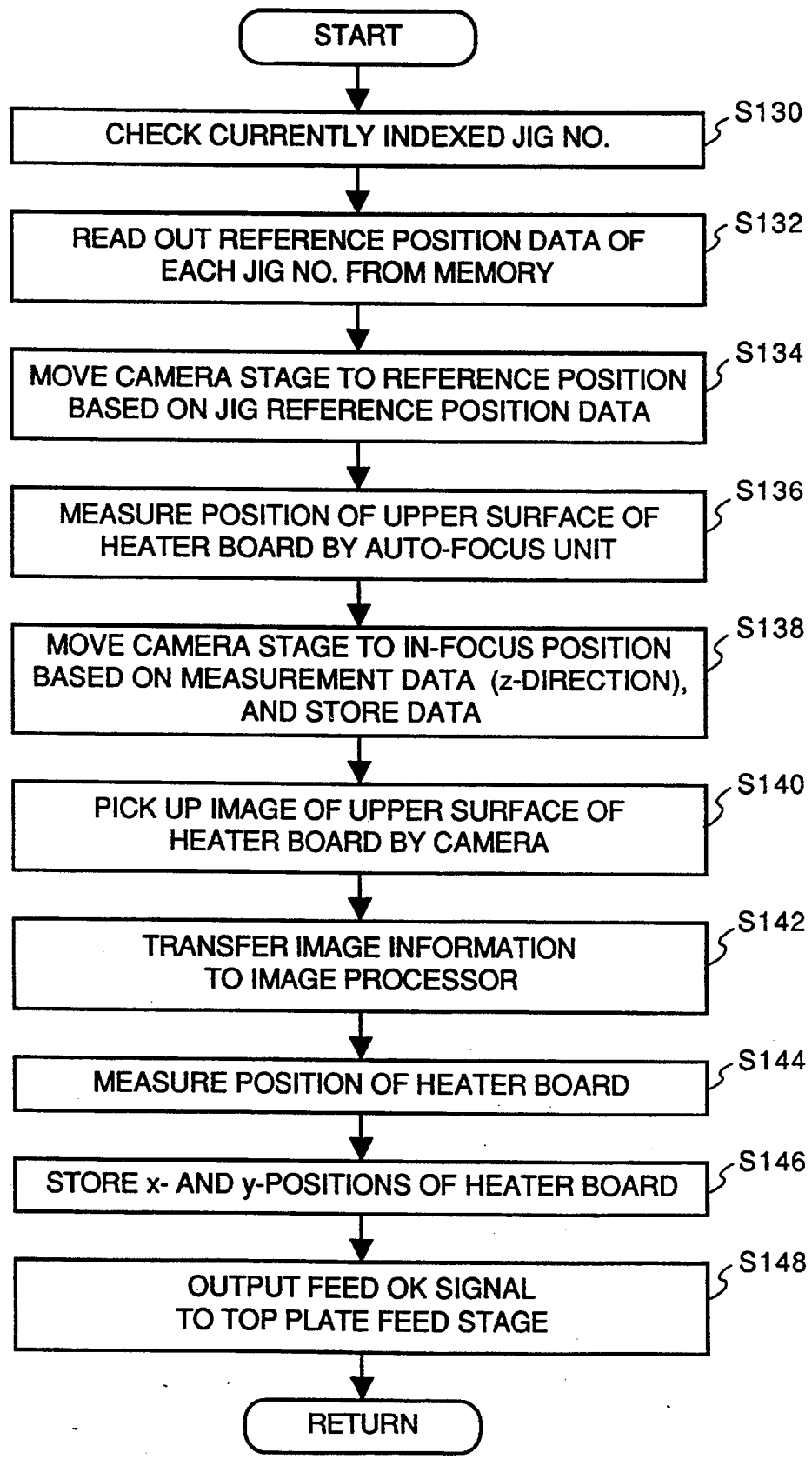
FIG. 28 is a flow chart for explaining a position measurement operation of a heater board.

An operation for measuring the position of the heater board 102 will be described below with reference to the flow chart shown in FIG. 28.

In step S130, a jig number of the clamp jig 24 currently aligned with the position of the second work station 18 is checked.

Since height information of the clamp jig corresponding to each jig number has already been stored in a memory of the controller 78, reference position data of the clamp jig 24 based on the height information of the clamp jig is read out from the memory in step S132.

In step S134, the stage 32 is vertically moved based on the readout reference position data, so that the first ITV camera 30 is located at a reference position with respect to the clamp jig 24.

In step S136, the first ITV camera 30 aligned with the reference position picks up an image of the heater board 102 attached onto the base plate 101, and an auto-focus unit (not shown) detects a focus position on the basis of the image signal from the ITV camera 30.

In step S138, the controller 78 moves the stage 32 on the basis of the detection signal from the auto-focus unit, thus causing the ITV camera 30 to focus on the heaters 112 on the surface of the heater board 102. At this time, the vertical moving amount of the stage 32 is measured, and the measured amount is stored in the memory as the height information of the surface of the heater board 102.

In step S140, in a state wherein the first ITV camera 30 is focused on the surface of the heater board 102, the first ITV camera 30 picks up an image of the surface of the heater board 102 again.

In step S142, image information picked up by the first ITV camera 30 is supplied to the image processor 80.

The image processor 80 comprises various signal converters, and executes a calculation of the position of center of gravity of the fetched image, edge detection, and the like, thereby measuring the position of a specific object in the fetched image. In this embodiment, the image processor 80 measures the x- and y-positions of the heaters 112 formed on the surface of the heater board 102.

On the heater board 102, an identification mark is formed at a position corresponding to a specific heater 112, and the position of the specific heater 112 can be measured based on this mark. In this embodiment, the nearest-side heater (the leftmost heater in the direction of an arrow) in FIG. 4 is defined as the specific heater, and will be referred to as a first heater 112a hereinafter. Note that the aligning precision of the index table 14, the dimensional precision of each clamp jig 24, the dimensional precision of the base plate 101, the adhesion precision of the heater board 102 with respect to the base plate 101, and the like are set to be high, so that a position deviation in the x- and y-directions between the position of the first heater 112a and the first ITV camera 30 is equal to or smaller than 1/10 the field of the first ITV camera 30. For this reason, the identification mark will not fall outside the field of the first ITV camera 30.

In step S144, the image processor 80 measures the x- and y-positions of the first heater 112a.

In step S146, the data of the position in the x- and y-directions measured in step S144 is stored in the memory.

In step S148, a feed OK signal for informing to the controller 78 that it is ready for feeding of the top plate 104 is output, and the position measurement operation of the heater board 102 is ended.

(Feed Operation of Top Plate 104)

Top plates 104 are stored in a tray 58 on which aligning portions are two-dimensionally formed (see FIG. 7), and such trays 58 are fed one by one from the tray stocker 60.

Figure 29:
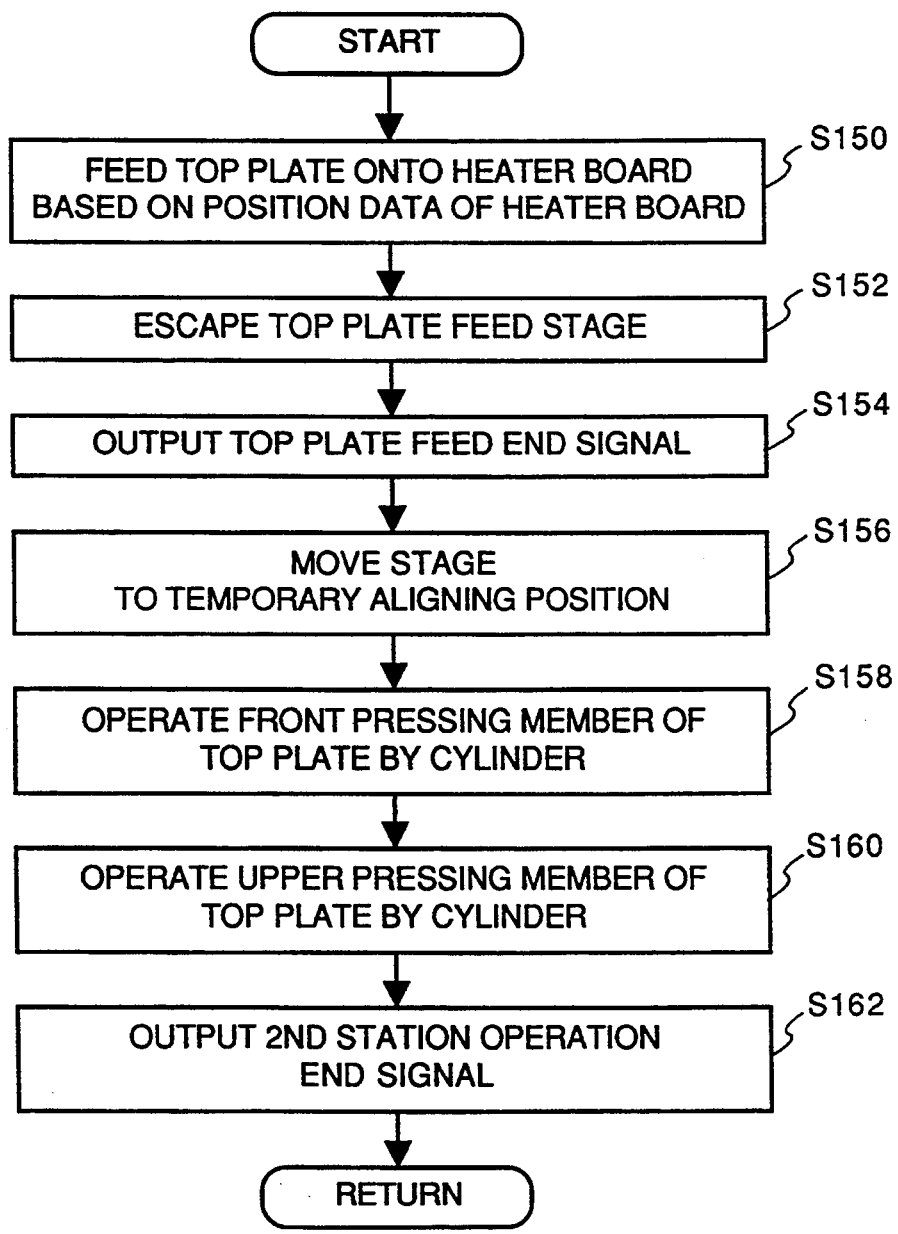
FIG. 29 is a flow chart for explaining a feed operation of a top plate.

The feed operation of a top plate 104 will be described below with reference to the flow chart shown in FIG. 29.

In step S150, the top plate 104 is chucked by the finger unit 68 attached to the distal end portion of the NC auto hand 70, and is picked up from the tray 58. The top plate is then fed onto the temporary aligning base 62. The top plate 104 is subjected to a predetermined aligning operation by the actuators 62a and 62b, and thereafter, is chucked by the finger unit 66 attached to the distal end of the stage 64, which is movable in the x-, y-, and z-directions. The top plate 104 is then fed onto the heater board 102 on the clamp jig 24, which is aligned with the position corresponding to the second work station 18. At this time, the position of the stage 64 is finely corrected in correspondence with the position data (the position data of the first heater 112a) measured in step S144, and thereafter, the top plate 104 is placed on the heater board 102.

In steps S152 and S154, the stage 64 is escaped from the index table 14, and a feed end signal indicating the end of the feed operation of the top plate 104 is output.

In step S156, the stage 64 is moved to the temporary aligning position.

In step S158, the air cylinder 88b is operated to rotate the front pressing member 84 in the direction of the arrow C in FIG. 9, and the orifice plate 108 of the top plate 104 is urged against the heater board 102 by the pressing spring 84b.

In step S160, the rotary air cylinder 250 is operated, so that the piston rod 250a is moved upward, is rotated through 90°, and thereafter, is moved downward again. With this operation, the coupling member 252 attached to the distal end of the piston rod 250a is engaged with the coupling member 242 of the upper pressing mechanism 82, and after the upper pressing member 82 is rotated from the escape position to the clamp position, the pressing spring 82b presses the ink reception port 118 of the top plate from a position immediately thereabove.

With the pressing operations of these pressing springs 82b and 84b, the top plate 104 is clamped on the heater board 102 (the state shown in FIG. 12).

In step S162, a work end signal is output, and the operation of the second work station 18 is ended.

{Operation during Movement from Second Work Station to Third Work Station}

When the operation for measuring the position of the heater board 102 and the operation for clamping the top plate 104 on the heater board 102 are ended in the second work station 18, the index table 14 is rotated, and the clamp jig 24 is moved toward the third work station 20.

During rotation of the index table 14, the position of the adjustment rod 42 of the position adjustment mechanism 38 is shifted by a difference $(x1-x0)+\alpha=\Delta$ (for $\alpha=5$ to 10 $\mu$m) between an x-position x1 of the first heater 112a measured in the second work station 18 and a designed position x0 (defined as the origin position, in the x-direction, of the first heater 112a) of the heater 112a.

In this case, for example, if (x1−x0) assumes a positive value, since this means that the heater board 102 is displaced to the left by |x1−x0| in FIG. 10, in order to align the position of the heater board 102 with that of the top plate 104, the top plate 104 must also be shifted to the left by |x1−x0| in FIG. 10. For this purpose, the adjustment rod 42 must be shifted to the left by the shift amount |x1−x0| in FIG. 13. However, in a later step, when the top plate 104 is butted against the adjustment rod 42 by the butting mechanism 39, the top plate 104 may be slightly returned from a position where it contacts the distal end of the adjustment rod 42 in FIG. 13 to the right due to the influence of the frictional force between the pressing springs 82b and 84b, which urge the top plate 104 against the heater board 102, the influence of flexures of these springs, and the like, when the butting force of the butting mechanism 39 is released. As a result, a gap of several $\mu$m may be formed between the top plate 104 and the distal end of the adjustment rod 42. When this gap is larger than the adjustment amount, even when the adjustment rod 42 is moved, the top plate 104 is not moved with respect to the heater board 102, and the position adjustment of the top plate is disabled. For this reason, in consideration of this gap, a margin $\alpha$ (5 to 10 $\mu$m) is added to the shift amount of the adjustment rod 42.

Also, during rotation of the index table 14, the second ITV camera 36 is moved by the stage 40 by a difference (y1−y0) between a position y1 of the first heater 112a measured in the second work station 18 and a designed position y0 of the first heater 112a. Similarly, the stage 40 is moved on the basis of the position data (z-position data), in the height direction, of the heater board 102 measured in the second work station 18, thereby adjusting the height position (z-position) of the second ITV camera 36.

{Operation in Third Work Station}

In the third work station 20, an operation (butting operation of the top plate) for urging the top plate 104 against the adjustment rod 42, and an operation for adjusting the position of the top plate 104 by the adjustment rod are performed.

(Butting Operation of Top Plate)

Figure 30:
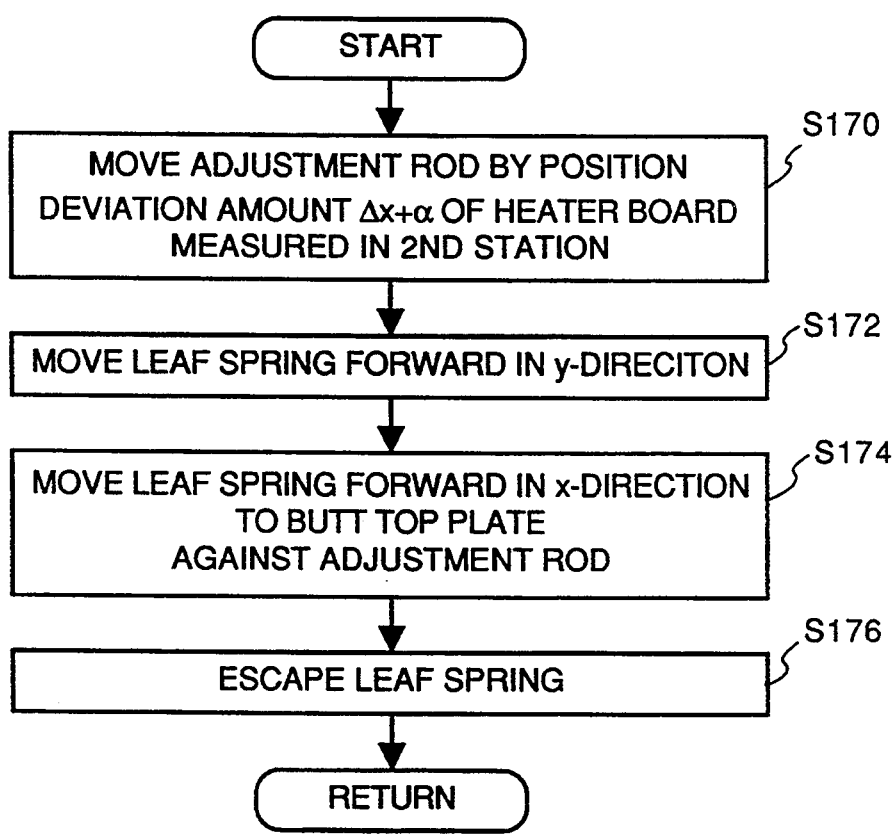
FIG. 30 is a flow chart for explaining a butting operation of the top plate.

The butting operation of the top plate 104 will be described below with reference to the flow chart shown in FIG. 30, and FIG. 13.

The operation in step S170 has already been ended during rotation of the index table 14.

In step S172, the leaf spring 264 of the butting mechanism 39 is moved to a right neighboring position of the top plate 104 by the y-slide table 260.

In step S174, the leaf spring 264 is moved in the x-direction by the x-slide table 262, and pushes the top plate 104 until the top plate 104 abuts against the distal end portion of the adjustment rod 42.

In step S176, the leaf spring 264 is escaped from the position above the clamp jig 24 by the operations of the x- and y-slide tables 262 and 260.

Thus, the butting operation of the top plate 104 is ended.

(Position Adjustment Operation of Top Plate 104)

Figure 31:
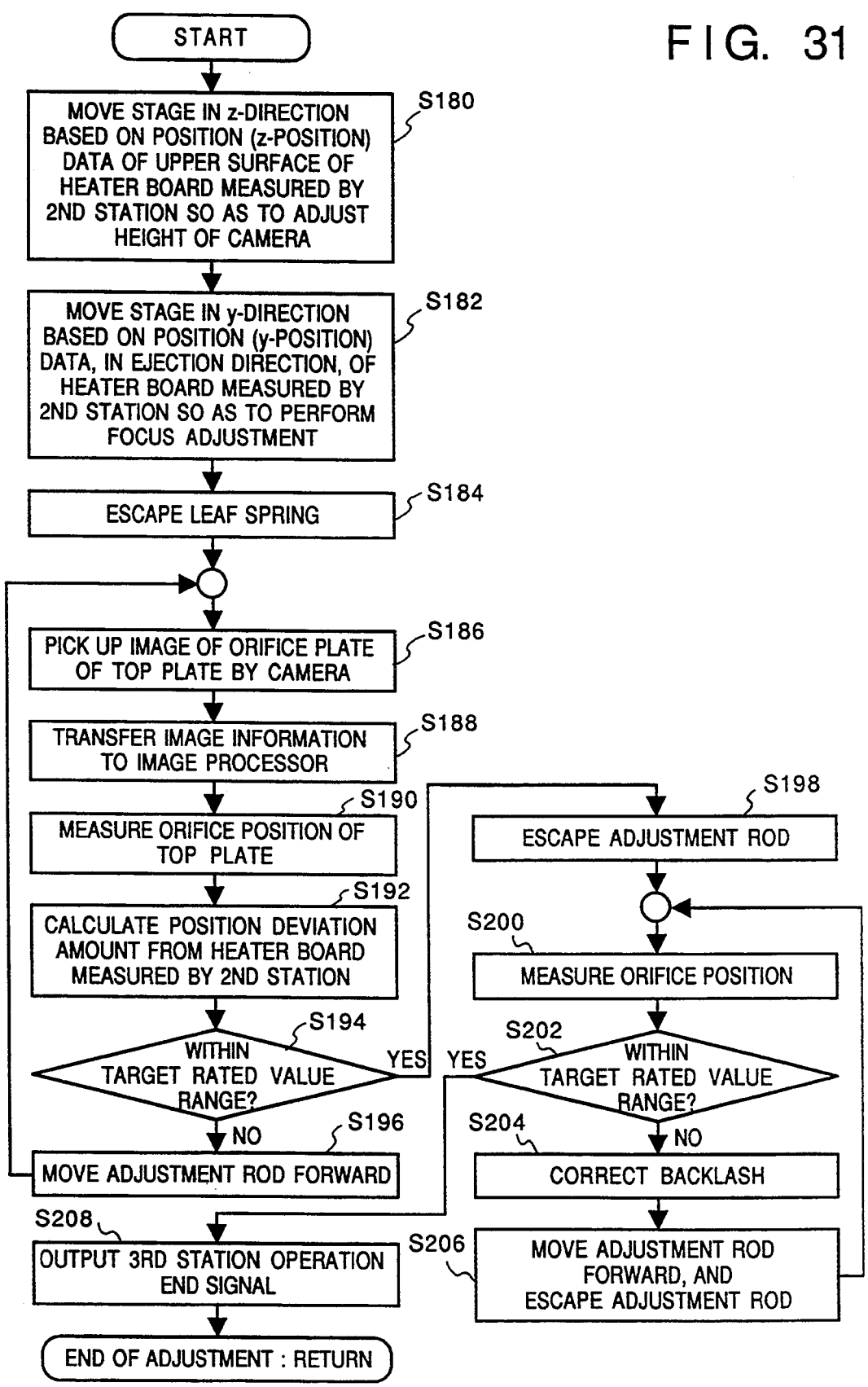
FIG. 31 is a flow chart for explaining position adjustment operation of the top plate.
Figure 32:
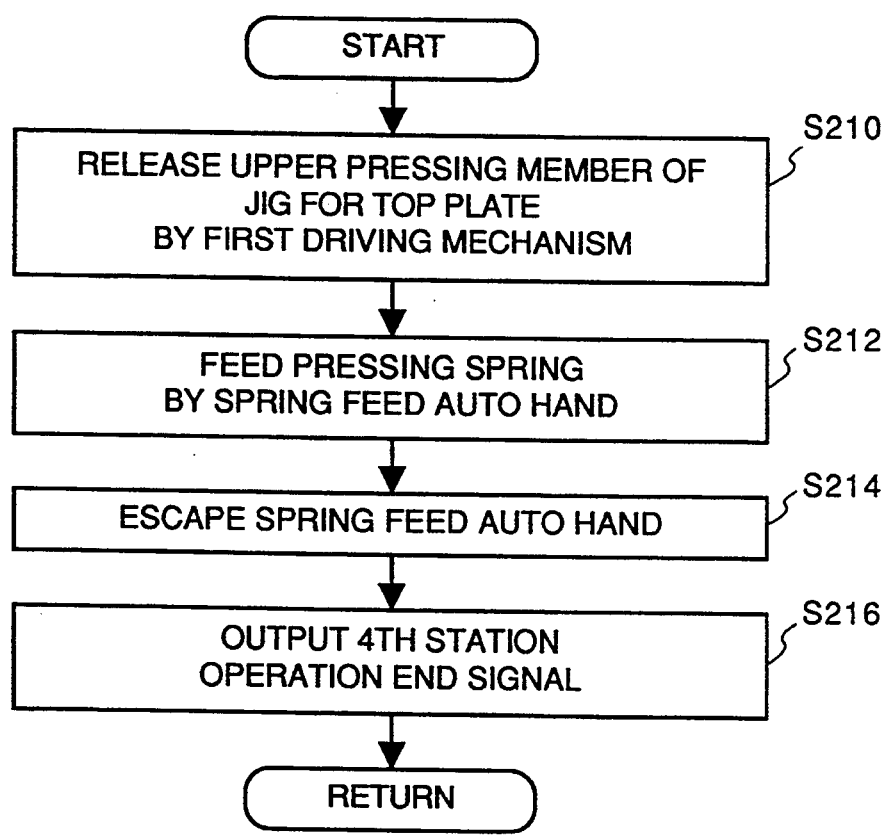
FIG. 32 is a flow chart for explaining the pressing spring attaching operation.

The position adjustment operation of the top plate 104 will be described below with reference to the flow chart shown in FIG. 31, and FIG. 13.

The position adjustment operation of the second ITV camera 36 in steps S180 and S182 has already been executed during the rotation of the index table 14, and the escape operation of the leaf spring 264 in step S184 has already been executed upon completion of the urging operation of the top plate 104.

In step S186, an image of the orifice plate 108 of the top plate 104 is picked up by the second ITV camera 36.

At this time, the y-position of the second ITV camera 36 has already been adjusted in correspondence with the position of the heater board 102 in step S182, and this adjusted position is calculated on the basis of the position information of the first heater 112a measured in the second work station 18. For this reason, the position where the second ITV camera 36 is aligned is slightly different from the actual in-focus position with respect to the surface of the orifice plate 108. For this reason, the second ITV camera 36 is not focused on the surface of the orifice plate 108 in a strict sense. However, this fact does not pose any problem in a practical use for the following two reasons.

The first reason is that the objective lens 36a of the second ITV camera 36 has a focal depth of about several $\mu$m (about 5 $\mu$m in this embodiment), and the focal point need not be adjusted up to precision of 1 $\mu$m. The second reason is as follows. As will be described later, in this embodiment, the position of each ejection orifice 106 is detected by calculating the center of gravity of the ejection orifice 106. In the calculation of the position of center of gravity of the orifice, it is known based on the experimental results that the precision of the calculation result is not lowered even when an object is set in a slightly defocused state.

In step S188, image information picked up by the second ITV camera 36 is supplied to the image processor 80.

In step S190, the image processor 80 performs the measurement operation of the positions of the ejection orifices 106 of the top plate 104.

In this step, the position of a specific ejection orifice 106 corresponding to the first heater 112a is measured. A method of detecting the specific ejection orifice 106 will be described below. In this embodiment, since the first heater 112a is located at the end on the heater board 102, the specific ejection orifice 106 similarly corresponds to a first ejection orifice 106a located at the end of the top plate 104.

The position of the second ITV camera 36 is set, so that the central position (designed value) of the first heater 112a is located at the center of the field of the second ITV camera 36. Therefore, the second ITV camera 36 picks up an image of the ejection orifice 106 located near the central position of the first heater 112a.

The image processor 80 measures the position of the ejection orifice 106 closest to the position of the first heater 112a on the frame on the basis of the position data of the first heater 112a measured in the second work station 18. Then, the image processor 80 detects whether or not another ejection orifice 106 is present at a left neighboring position separated by one pitch from the ejection orifice 106 closest to the position of the first heater 112a.

If no ejection orifice 106 is present at the left neighboring position separated by one pitch, the ejection orifice 106 closest to the position of the first heater 112a is determined as the ejection orifice at the end, i.e., the first ejection orifice 106a. The position data measured in the previous step is determined as that of the first ejection orifice 106a.

If an ejection orifice 106 is present at the left neighboring position separated by one pitch, it is detected whether or not still another ejection orifice 106 is present at a left neighboring position separated by another one pitch. If no ejection orifice 106 is present at this position, the finally detected ejection orifice 106 is determined as the ejection orifice at the end, i.e., the first ejection orifice 106a.

If ejection orifices 106 are present in the entire range of the field of the second ITV camera 36, an error occurs. However, in practice, as described above, prior to the measurement of the positions of the ejection orifices 106, since the top plate 104 is butted to one side so that the position of the first ejection orifice 106a falls within one pitch with respect to the position of the first heater 112a, the possibility of an error is almost zero.

In order to cause the position of the second ITV camera 36 to coincide with the position of the first ejection orifice 106a so as not to cause an error, the dimensional precision of the first ejection orifice 106a with respect to the outer shape of the top plate 104 must be set to be equal to or smaller than ½ one pitch of the ejection orifices 106, and the attaching precision of the heater board 102 to the base plate 101 must be to be equal to or smaller than ½ one pitch.

In this manner, the position of the specific ejection orifice, i.e., the first ejection orifice 106a can be detected.

In step S192, the position data of the first ejection orifice 106a detected in step S190 is compared with the position data of the first heater 112a measured in the second work station 18, and a position deviation amount therebetween is calculated.

In step S194, it is checked if the position deviation amount falls within a target rated value range. If YES in step S194, the flow advances to step S198; otherwise, the flow advances to step S196, and the position adjustment operation of the top plate 104 is performed.

The position adjustment operation of the top plate 104 will be described below.

The position adjustment operation of the top plate 104 is executed by moving the adjustment rod 42 to the right in FIG. 13 by the stage 44 by a small amount. This moving amount is set as an adjustment amount (the above-mentioned position deviation amount)×a coefficient (coefficient≦1).

In this manner, the actual moving amount of the adjustment rod is set to be smaller than the adjustment amount for the following reason.

The top plate 104 is easy to deform since it consists of a resin material. When the top plate 104 is moved for position adjustment while clamping its two side portions, a position deviation may occur when the clamp state is released. In this embodiment, in order to prevent a position deviation caused by the deformation of the top plate 104, a method of aligning the top plate 104 by pushing it from one direction is adopted. For this reason, when the top plate 104 is excessively pushed by the adjustment rod 42, and exceeds a target position, the flow must return to the butting step using the butting mechanism 39 so as to execute the position adjustment of the top plate 104 again. In this embodiment, the moving amount of the adjustment rod is set to be slightly smaller than the adjustment amount so that the top plate 104 can be prevented from exceeding the target position.

Upon completion of the first position adjustment, the flow returns to step S186, and the adjusted position of the first ejection orifice 106a is measured by the image processor 80 on the basis of image information from the second ITV camera 36. If it is determined in step S194 that the measured position deviation amount between the first heater 112a and the first ejection orifice 106a falls within the target rated value range, the adjustment is stopped.

If the position deviation amount falls outside the target rated value range again, the position adjustment operation is repeated once again. In this manner, steps S186 to S194 are repeated until the position deviation amount falls within the target rated value range, and when the position deviation amount falls within the target rated value range, the flow advances to step S198.

In step S198, the adjustment rod 42 is escaped from the top plate 104.

In step S200, the position of the first ejection orifice 106a is measured again. The reason why the position of the first orifice 106a is measured again is that the top plate 104 may be returned by the flexures of the pressing springs 82b and 84b, frictional forces, and the like, and may cause a position deviation (backlash).

In step S202, it is checked if the position deviation amount of the first ejection orifice 106a measured in step S200 falls within the target rated value range. If YES in step S202, the position adjustment operation of the top plate 104 is ended, and the flow advances to step S208.

In step S208, an end signal is output indicating the end of the operation of the third work station 20, and the flow returns to the main routine.

If it is determined in step S202 that the position deviation amount falls outside the target rated value range, the flow advances to step S204, and an operation for correcting the backlash is performed.

The backlash correction operation will be described below. Assume that the position of the first ejection orifice 106a after the top plate 104 is returned by the flexures of the pressing springs or the frictional force is represented by Bx, the escaping amount of the adjustment rod 42 is represented by Cx, the position of the first ejection orifice 106a before the adjustment rod 42 is escaped is represented by Tx, and the target position is represented by Mx. In this case, the moving amount of the adjustment rod 42 upon re-adjustment of the position of the top plate 104 is given by:

$$\{(Bx-Tx)+(Bx-Mx)\} \times \text{Coefficient} + Cx$$

where (Bx−Tx): the backlash amount and coefficient≦1.

The moving amount of the adjustment rod 42 is set in this manner, and the adjustment is repeated until the position deviation amount of the first ejection orifice 106a falls within the target rated value range (steps S204 and S206). If the backlash correction is not performed, the position deviation amount cannot often be reduced to fall within the rated value range.

When the position adjustment of the top plate 104 is performed, the top plate 104 is kept pressed by the pressing springs 82b and 84b. More specifically, the top plate 104 is held by the frictional force, generated by the biasing forces of the pressing springs 82b and 84b, between these springs and the top plate 104 or between the top plate 104 and the heater board 102. For this reason, the heater board 102 and the top plate 104 can be moved to the next fourth work station 22 while holding the positional relationship therebetween without executing any temporary fixing step using, e.g., an ultraviolet curing adhesive.

{Operation in Fourth Work Station}

Upon completion of the position adjustment operation of the top plate 104 in the third work station 20, the index table 14 is rotated, and the clamp jig 24 is aligned with the fourth work station 22 in a state wherein the top plate 104 is clamped by the pressing springs 82b and 84b. In the fourth work station 22, the pressing spring 120 for fixing the top plate 104 to the base plate 101 is attached to the base plate 101.

The attaching operation of the pressing spring 120 will be described below with reference to the flow chart shown in FIG. 32, FIG. 10, and FIGS. 17 to 21.

In step S210, the first driving mechanism 86 arranged on the stand 12 is operated to cause the upper pressing member 82 to escape to the escape position indicated by an alternate long and two short dashed line in FIG. 10. Thus, since there is no obstacle above the top plate 104, the pressing spring 120 can be attached to the base plate 101 from a position above the top plate 104.

In step S212, the assembling finger unit 47 chucks the pressing spring 120 separated by the separation mechanism 54, and attaches it to the base plate 101 by the operations shown in FIGS. 17 to 21.

Upon completion of the attaching operation, the assembling finger unit 47 is escaped from the position above the clamp jig in step S214.

In step S216, an end signal indicating the end of the operation in the fourth work station 22 is output, and the flow returns to the main routine.

In this manner, the assembling operations for one cycle in the first to fourth work stations 16 to 22 are ended.

In the above description, the operations of the first to fourth work stations 16 to 22 have been described in turn. However, when the assembling apparatus 10 operates in practice, the first to fourth work stations 16 to 22 simultaneously execute their operations, and the tact time of the assembling apparatus 10 coincides with that of the most time-consuming one of the first to fourth work stations.

{Position Calibration Operation of Two ITV Cameras}

In the assembling apparatus 10 of this embodiment, as described above, since the first ITV camera 30 is arranged on the second work station 18, and the second ITV camera 36 is arranged on the third work station 20, a calibration operation for detecting the relative position between these two ITV cameras must be performed. The calibration operation will be described below with reference to FIG. 23.

The assembling apparatus 10 of this embodiment is programmed to be automatically set in a calibration mode every time a predetermined number of head nozzles 100 (base plates 101 attached with top plates 104) are manufactured. The predetermined number can be changed by setting an initial parameter.

In the calibration mode, the NC auto hand 72 chucks the calibration member 290 by the first finger 73a of the finger unit 73, and places it on the clamp jig 24. The calibration member 290 is clamped on the clamp jig 24 in the same manner as the base plate 101, and is indexed to the second work station 18.

In the second work station 18, the first ITV camera 30 is focused on an upper surface 290d of the calibration portion 290b. The first ITV camera 30 picks up an image of the groove portion 290c from above, and the picked-up image information is supplied to the image processor 80. The image processor 80 measures the position of the groove portion 290c. At this time, the position of a front edge portion 290e of the calibration portion 290b is measured at the same time. In the calibration mode, no top plate 104 is fed in the second work station 18, and the clamp jig 24 is indexed to the third work station 20.

In the third work station 20, the second ITV camera 36 is focused on the surface of the front edge portion 290e on the basis of the position data of the front edge portion 290e of the calibration portion 290b measured in the second work station 18. The second ITV camera 36 picks up an image of the groove portion 290c, and the picked-up image information is supplied to the image processor 80. Thus, the position of the groove portion 290c is measured from the front side.

The position deviation amount between the first and second ITV cameras 30 and 36 is calculated based on the position data of the groove portion 290c measured in the second work station 18 and the position data of the groove portion 290c measured in the third work station 20. An allowable value is preset for this deviation amount, and a correction parameter of the program is set, so that if the calculated deviation amount falls within an allowable value range, the position measurement data of the second ITV camera 36 is corrected on the basis of this deviation amount. Then, the position data measured by the second ITV camera 36 after this calibration operation is corrected on the basis of this correction parameter.

On the other hand, if the calculated deviation amount exceeds the upper limit of the allowable value range, an indication lamp (not shown) attached to the assembling apparatus 10 is turned on to inform an abnormality to an operator, and the assembling apparatus 10 is stopped.

When the deviation amount of the two cameras measured in the third work station 20 falls within the allowable value range, and the correction parameter is set, the clamp jig 24 is indexed to the fourth work station 22. In the fourth work station 22, no operation is performed, and the clamp jig 24 on which the calibration member 290 is placed is indexed to the first work station 16 simultaneously with the end of operations in the remaining first to third work stations 16 to 20. The calibration member 290 is returned to the standby position by the NC auto hand 72, and the position calibration operation of the first and second ITV cameras 30 and 36 is ended.

At this time, the auto hand 72 chucks the next unfinished base plate 101 from the pallet 27, and moves it to a position above the clamp jig 24, thus successively executing the discharging operation of the calibration member 290 and the feed operation of the unfinished base plate 101. In this manner, the time loss in the assembling operations can be reduced. When the calibration member 290 is saved, since the NC auto hand 72 is temporarily moved to the standby position of the calibration member 290, the cycle time of the auto hand 72 becomes slightly longer than the normal time.

{Calibration Operation of Jig Parameters}

The calibration operation of jig parameters will be described below. In the assembling apparatus 10 of this embodiment, since the position of the top plate 104 is adjusted on the basis of the position data measured by the first ITV camera 30 arranged on the second work station 18, and the second ITV camera 36 arranged on the third work station 20, the relative position among the four clamp jigs 24 need not be adjusted so strictly as long as the clamp jig 24 does not deviate upon movement from the second work station 18 to the third work station 20. However, in practice, when the position of the clamp jig 24 deviates, the following problems are posed.

As the first problem, the focusing range of the first ITV camera 30 is substantially the same as a variation of the height of the heater board 102, and the variation of the height of the clamp jig 24 cannot be corrected. As the second problem, the field ranges of the first and second ITV cameras 30 and 36 deviate due to a change in position of the clamp jig 24 over a long period of time. Thus, in this assembling apparatus 10, the jig parameter can be calibrated by utilizing the calibration member 290.

The first calibration is manually performed. At this time, the clamp jigs 24 are attached on the index table 14 to have certain precision. The calibration member 290 is placed on and clamped by the clamp jig 24, and thereafter, the clamp jig 24 is indexed to the second work station 18 to perform an auto-focusing operation of the first ITV camera 30. At this time, when the camera 30 cannot be focused on the surface 290d of the calibration member 290, the position adjustment of the calibration member 290 is performed again. Upon completion of the position adjustment, the auto-focusing operation of the first ITV camera 30 is performed again. At this time, when the camera 30 can be focused on the surface 290d of the calibration member 290, the z-position data of the stage 32 at that time is determined as a height reference correction value of this clamp jig 24, and thereafter, the auto-focusing operation of the first ITV camera 30 is performed with reference to this height reference correction value. With this operation, the first problem can be solved.

After the auto-focusing operation of the first ITV camera 30 is performed, as described above, the x- and y-positions of the groove portion 290c of the calibration member 290 are measured, and these position data are also set as reference correction values in the program. Thus, the setting operation of the jig parameters for one clamp jig 24 is completed. The jig parameters are similarly set for the remaining three clamp jigs 24. With this operation, the positions of the four clamp jigs 24 need not be strictly adjusted in a hardware manner, and can be corrected in a software manner.

In order to solve the second problem, in this assembling apparatus 10, the jig parameters are automatically calibrated every time a predetermined number of operation cycles are completed during the assembling operations. The predetermined number of operation cycles can be arbitrarily set in advance.

When this automatic parameter calibration is executed, the calibration member 290 is clamped by the clamp jig 24, and the clamp jig 24 is indexed to the second work station 18. After the clamp jig 24 is indexed to the second work station 18, the auto-focusing operation of the first ITV camera 30 is performed. When the z-position data measured by the first ITV camera 30 at this time falls within a predetermined reference value range, the position data is set as a new height reference correction value in the program. Then, the x- and y-positions of the groove portion 290c of the calibration member 290 are measured, and if these position data fall within a predetermined allowable value range, the position data are set as reference correction values in the program. With the above-mentioned operation, calibration of the jig parameters for one clamp jig 24 is completed, and the clamp jig 24 is returned to the first work station 16 without performing any operations in the third and fourth work stations 20 and 22.

Then, the calibration member 29 is fed to the clamp jig 24 arranged at the next position, and the calibration operation is continued. In this manner, the calibration operations for all the four clamp jigs are performed.

[Another Embodiment]

In the above embodiment, the index table is stopped at four 90°-interval positions, and the assembling operations are performed by the four work stations arranged in correspondence with these stop positions. Also, a 5- or 6-divisional step type assembling apparatus in which another or other assembling operation or operations is or are added after the fourth work station may be available.

Thus, in this embodiment, a 5-divisional step type assembling apparatus will be described below. In this apparatus, driving units for clamp levers for clamping the base plate 101 are arranged outside the index table. A first work station performs a pickup/place operation of the base plate 101, a second work station performs an aligning operation of the base plate 101, a third work station performs a position measurement operation of the heater board and a feed operation of the top plate 104, a fourth work station performs a position measurement operation and a position adjustment operation of the top plate 104, and a fifth work station performs an assembling operation of the pressing spring 120.

The arrangement of this embodiment will be described below with reference to FIGS. 33, 34, and 35.

Figure 33:
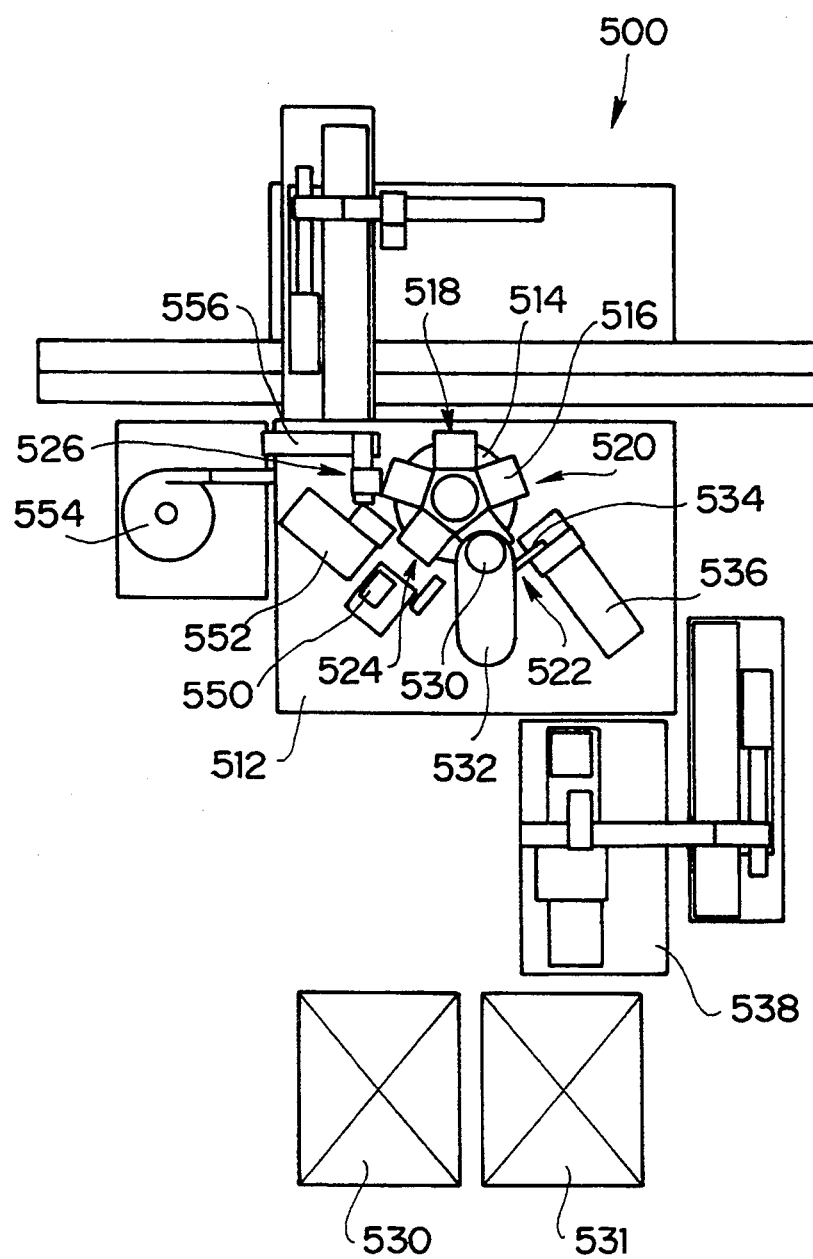
FIG. 33 is a plan view showing the structure of an ink-jet head assembling apparatus according to another embodiment of the present invention.

FIG. 33 is a schematic plan view showing an arrangement of an assembling apparatus 500 of this embodiment. An index table 514 is arranged on the upper surface of a stand 512, and five clamp jigs 516 are arranged on the upper surface of the index table 514. An upper work station in FIG. 33 corresponds to a first work station 518, and second to fifth work stations 520 to 526 are arranged on the stand 512 to be aligned clockwise in turn from the first work station 518.

On the third work station 522, a first ITV camera 530 for measuring the position of the heater board 102 is attached to a column 532 via a stage (not shown). A stage 536 attached with a finger unit 534 for feeding the top plate 104 is arranged at the position corresponding to the third work station 522 together with a stock unit 538. These detailed arrangements are the same as those in the above-mentioned embodiment.

On the fourth work station 524, a second ITV camera 550 for measuring the position of the top plate 104 and a position adjustment mechanism 552 are arranged. On the fifth work station 526, a vibration type ball feeder 554 for feeding the pressing spring 120 and an assembling auto hand 556 are arranged.

Figure 34:
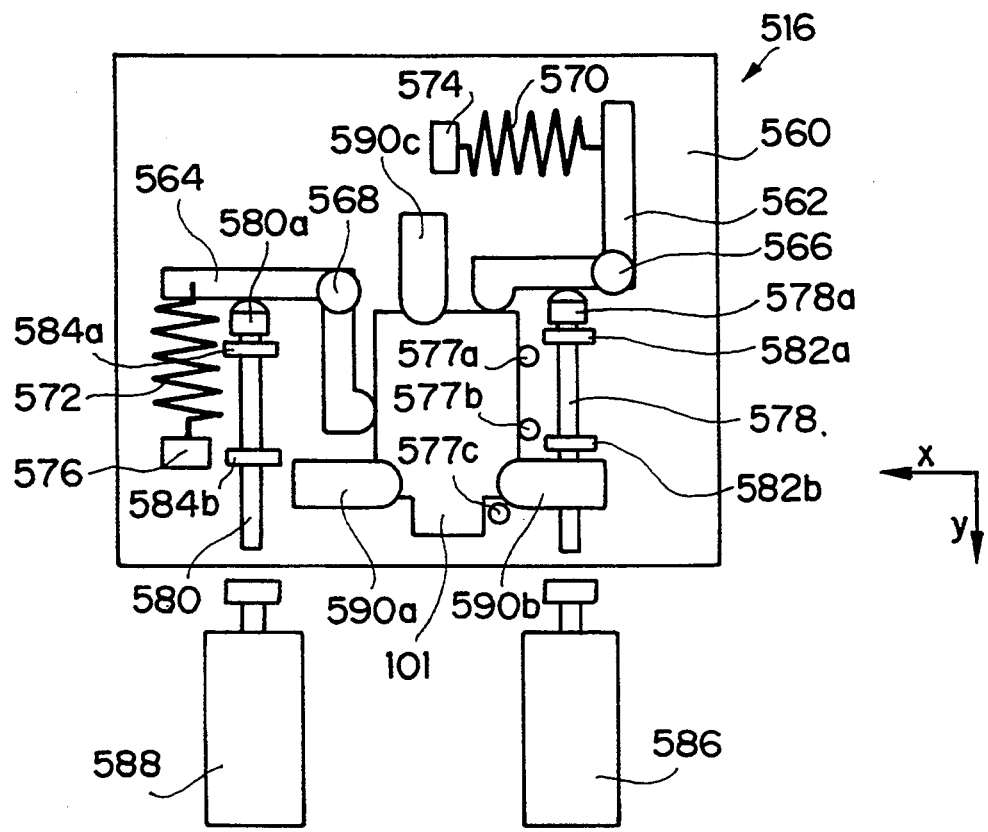
FIG. 34 is a plan view showing the structure of a clamp jig used in the ink-jet head assembling apparatus of the embodiment shown in FIG. 33.

FIG. 34 is a plan view showing an arrangement of the clamp jig 516.

Substantially L-shaped clamp levers 562 and 564 are arranged on the upper surface of a jig main body 560 to be respectively rotatable about shafts 566 and 568 in a horizontal plane. Torsion springs 570 and 572 are respectively attached to one-end portions of these clamp levers 562 and 564. One-end portions of the torsion springs 570 and 572 are respectively fixed to fixing portions 574 and 576. Therefore, the clamp levers 562 and 564 are biased counterclockwise by these torsion springs 570 and 572. The other end portions of the clamp levers 562 and 564 thus contact the base plate 101 to urge the base plate 101 against aligning pins 577a, 577b, and 577c.

Slide shafts 578 and 580 respectively have semispherical abutting portions 578a and 580a at their one-end portions, and are attached to the jig main body 560 respectively through attaching members 582a, 582b, 584a, and 584b to be slidable in the y-direction. These slide shafts 578 and 580 are biased upward in FIG. 34 by springs (not shown) weaker than the torsion springs 570 and 572, and the abutting portions 578a and 580a at their distal end portions are always kept in contact with the clamp levers 562 and 564. Air cylinders 586 and 588 are arranged at positions, outside the index table 514, on the first and second work stations 518 and 520. Upon operation of these air cylinders 586 and 588, the clamp levers 562 and 564 are rotated clockwise, and the clamp state of the base plate 101 is released.

Figure 35:
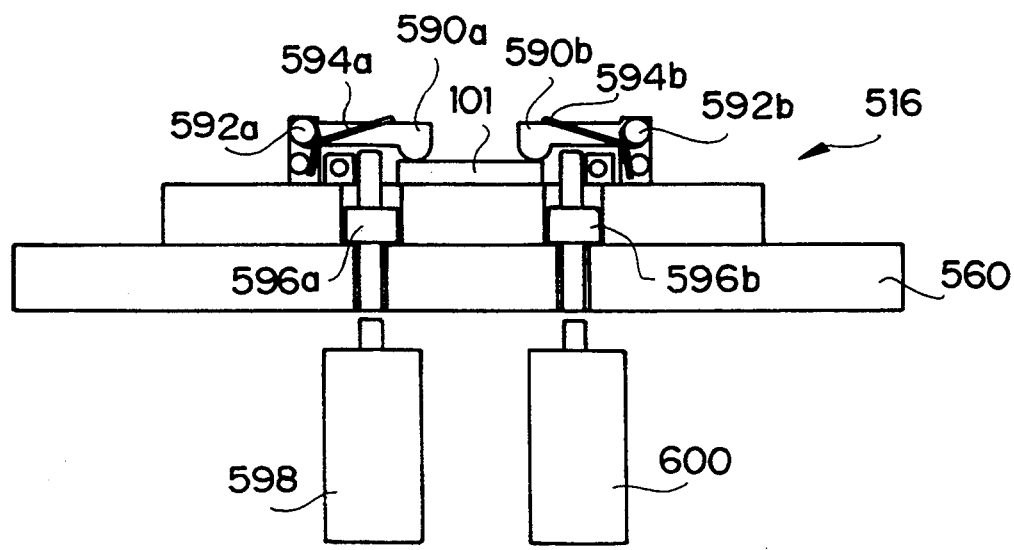
FIG. 35 is a front view of the jig shown in FIG. 34 when it is viewed from the front side.

As shown in FIG. 35 as the side sectional view of the clamp jig 516, clamp levers 590a and 590b having semispherical projections at their distal end portions are vertically rotatably supported on the upper surface of the jig main body 560 by shafts 592a and 592b, respectively. These clamp levers 590a and 590b are respectively biased by torsion springs 594a and 594b in a direction to urge the base plate 101 against the jig main body 560. Rods 596a and 596b each having a central stepped portion are inserted in through holes formed to extend through the jig main body 560 and the index table 514.

Air cylinders 598 and 600 are arranged at positions below the index table 514 corresponding to the first and second work stations 518 and 520. Upon operation of these air cylinders 598 and 600, the clamp levers 590a and 590b are respectively pushed upward, and the clamp state of the base plate 101 is released. Although not shown, the same mechanism is arranged for a clamp lever 590c.

In this embodiment, since the base plate 101 is clamped and unclamped by the air cylinders arranged outside the index table 514, a piping system for supplying compressed air to the air cylinders need not be arranged on the index table 514. Since the air cylinders need not be arranged in correspondence with the clamp jigs 516 on the index table 514, the number of air cylinders can be decreased, and cost of the assembling apparatus can be reduced. However, since the base plate 101 cannot be aligned during rotation of the index table 514, when the base plate 101 is to be aligned with the clamp jig 516 in the first work station 518 alone, the tact time is undesirably prolonged.

In this embodiment, in the first work station 518, the air cylinders 586, 588, 598, and 600 are quickly operated to temporarily align the base plate 101, and in the second work station 520, the air cylinders 586, 588, 598, and 600 are slowly operated again to precisely align the base plate 101.

In this manner, the tact time of only one work station can be prevented from being prolonged to prolong the total tact time of the assembling apparatus 500 as a whole.

Note that the present invention can be applied to modified or changed ones of the above embodiments within the scope of the invention.

The present invention is not limited to the above embodiments and various changes and modifications can be made within the spirit and scope of the present invention. Therefore, to apprise the public of the scope of the present invention the following claims are made.

What is claimed is:

1. An ink-jet head assembling apparatus for assembling a head nozzle for an ink-jet, which ejects an ink in a predetermined pattern, using a heater board comprising a plurality of heaters for heating the ink, and a top plate member comprising a plurality of ejection orifices for ejecting the ink heated by the corresponding heaters in a jet form, comprising:

a plurality of work stations arranged on a circumference of a circle at predetermined angular intervals;

an index table rotatable about a center of the circle, and aligned at each of the predetermined angular intervals;

holding means, fixed on said index table, said holding means having a position corresponding to at least a given one of said plurality of work stations in a stationary state of said index table, for holding said top plate member on said heater board; and switching means, arranged at said given work station at a location outside said index table, for switching said holding means between a holding state wherein said top plate member is held on said heater board, and a non-holding state which is effected by releasing the holding state.

2. The apparatus according to claim 1, wherein said holding means holds said top plate member by forcing said top plate member against a one of a top face and a side face of said heater board by a spring force.

3. An apparatus according to claim 2, further comprising aligning means for aligning said heater board and said top plate member by shifting a position of said heater board and a position of said top plate member against a frictional force between said heater board and said top plate member generated by the spring force in a state where said top plate member is forced against a one of a top face and a side face of said heater board.

4. An apparatus according to claim 1, further comprising assembling means for assembling a fixing member to said top plate and said heater board so as to fix said top plate member to said heater board to fix said top plate member and said heater board in a state where said top plate member is forced against a one of a top face and a side face of said heater board.

5. An apparatus according to claim 1, wherein said holding means remains in a one of said holding state and said non-holding state even after said switching means has ceased operation.

6. An ink-jet head assembling method of assembling a head nozzle for an ink-jet head, which ejects an ink in a predetermined pattern, using a heater board comprising a plurality of heaters for heating the ink and a top plate member comprising a plurality of ejection orifices for ejecting the ink heated by the corresponding heaters in a jet form, using an apparatus comprising a plurality of work stations arranged on a circumference of a circle at predetermined angular intervals, and an index table rotatable about the center of the circle and aligned at each of the predetermined angular intervals; comprising a first step of transferring a completely-assembled ink-jet head from said index table to a pallet for finished product by a first transferring means disposed at a first said work station;

a second step of transferring an incomplete workpiece having said heater board from a pallet for unfinished product to said index table using said first transferring means;

a third step of gripping the incomplete workpiece on said index table using a gripping means disposed on the index table;

a fourth step of rotating said index table, and moving the incomplete workpiece to a position corresponding to a second said work station;

a fifth step of detecting a position of the heater board of the incomplete workpiece using a first position detecting means disposed at said second work station;

a sixth step of transferring said top plate member from a tray storing said top plate member disposed at said second work station to the heater board of the incomplete workpiece using a second transferring means arranged at said second work station;

a seventh step of switching a holding means for holding said top plate member to said heater board so as to hold said top plate member using a switching means arranged at said second work station;

an eighth step of rotating said index table while said top plate member is held on said heater board, and moving said top plate member and said heater board to a third said station;

a ninth step of detecting a position of said top plate member held on said heater board using a second position detecting means disposed at said third station;

a tenth step of adjusting a relative position of said top plate member and said heater board by position adjustment means arranged at said third work station, so that said top plate member and said heater board have a predetermined positional relationship, by comparing the position of said heater board detected by said first position detection means and the position of said top plate member detected by said second detection means;

an eleventh step of rotating said index table, and moving said top plate member and said heater board to a position corresponding to a fourth said work station;

a twelfth step of assembling a fixing member to said top plate and said heater board using an assembling means disposed at said fourth station; and a thirteenth step of switching said holding means to a state which does not hold said top plate member on said heater board, using said switching means disposed at said first work station.

7. A method according to claim 6, further comprising a step of moving said second position detection means disposed at said third work station to an optimal position for measuring the position of said top plate member based on the position of said heater board detected by said first position detection means arranged at said second work station, and moving a position adjustment means arranged on said third work station to an optimal position for adjusting the position of said top plate member with respect to said heater board during movement of said heater board from said second work station to said third work station.

8. A method according to claim 7, wherein said first and said second position detection means respectively detect the position of said heater board and the position of said top plate member by image processing based on picked-up image information.

9. A method according to claim 7, further comprising the steps of calculating a difference between the position of said heater board detected by said first detection means and a desired position of said heater board, and setting a moving amount of said position adjustment means to be slightly larger than said difference.

10. A method according to claim 7, wherein a difference between results detected by said first and said second position detection means is determined as an adjustment amount, and said position adjustment means is moved by the adjustment amount multiplied by a coefficient which is less than 1.

11. A method according to claim 10, further comprising the steps of:

determining a position deviation amount between said top plate member and said heater board which is caused by a backlash when said position adjustment means adjusts the position of said top plate member, said position adjustment means applying a position adjustment force to said top plate member, and when said position deviation amount falls outside of a predetermined range, releasing said position adjustment force of said position adjustment means which is applied to said top plate member.

* * * * *

UNITED STATES PATENT AND TRADEMARK OFFICE
CERTIFICATE OF CORRECTION

PATENT NO. : 5,373,633
DATED : December 20, 1994
INVENTOR(S) : TSUNENOBU SATOI, ET AL.

It is certified that error appears in the above-identified patent and that said Letters Patent is hereby corrected as shown below:

ON TITLE PAGE

In [56] References Cited, under FOREIGN PATENT DOCUMENTS:
"295502  10/1991  Germany" should read
--295502  10/1991  Dem. Rep. of Germany--.

COLUMN 2

Line 64, "long" should read --a long--.

COLUMN 3

Line 9, "long" should read --a long--.

COLUMN 10

Line 6, "pallellopiped" should read --parallelopiped--.

COLUMN 17

Line 54, "car,eras" should read --cameras--.

UNITED STATES PATENT AND TRADEMARK OFFICE
CERTIFICATE OF CORRECTION

PATENT NO. : 5,373,633
DATED : December 20, 1994
INVENTOR(S) : TSUNENOBU SATOI, ET AL.

It is certified that error appears in the above-identified patent and that said Letters Patent is hereby corrected as shown below:

COLUMN 21

Line 68, "jig 24.is" should read --jig 24 is--.

Signed and Sealed this

Sixteenth Day of May, 1995

Attest:

BRUCE LEHMAN

Attesting Officer      Commissioner of Patents and Trademarks